United States Patent [19]
Tran

[11] Patent Number: 5,287,110
[45] Date of Patent: Feb. 15, 1994

[54] COMPLEMENTARY THREAT SENSOR DATA FUSION METHOD AND APPARATUS

[75] Inventor: My Tran, Albuquerque, N. Mex.

[73] Assignee: Honeywell, Inc., Minneapolis, Minn.

[21] Appl. No.: 977,321

[22] Filed: Nov. 17, 1992

[51] Int. Cl.$^5$ .......................... G01S 7/36; G01S 7/38; H04K 3/00

[52] U.S. Cl. ..................................... 342/13; 342/15; 342/16; 342/17

[58] Field of Search ...................... 342/13, 14, 15, 16, 342/17, 18, 19, 20

[56] References Cited

U.S. PATENT DOCUMENTS

| | | | |
|---|---|---|---|
| 4,347,513 | 8/1982 | Schindler | 342/13 |
| 4,429,311 | 1/1984 | Barewald | 342/15 |
| 4,700,191 | 10/1987 | Manor | 342/13 |
| 4,851,854 | 7/1989 | Drogin | 342/417 |
| 4,876,545 | 10/1989 | Carlson et al. | 342/14 |
| 4,891,648 | 1/1990 | Jehle et al. | 342/20 |
| 4,990,920 | 2/1991 | Sanders, Jr. | 342/14 |
| 5,122,801 | 6/1992 | Hughes | 342/13 |
| 5,133,663 | 7/1992 | Willingham et al. | 434/2 |

*Primary Examiner*—John B. Sotomayor
*Attorney, Agent, or Firm*—Ronald E. Champion; Craig J. Lervick

[57] ABSTRACT

A complementary threat sensor data fusion capability for an aircraft survivability equipment system. A set of aircraft survivability sensors provides a threat sensor data fusion control process with status data. The control process controls whether or not a threat ambiguity detector receives radar warning receiver data or a radar emitter ID conversion apparatus receives pulsed radar jammer data or continuous wave radar jammer data. The threat sensor data fusion control process also determines whether missile approach detector data is sent to a countermeasures analyzing apparatus. The threat ambiguity detector provides ambiguity data to a threat ambiguity resolving apparatus. The radar emitter ID conversion apparatus provides converted jammer data to a functional sensor back-up apparatus. The radar emitter ID conversion process receives a common radar emitter ID data base. The threat sensor data fusion process controller also provides fusion process control to the complementary threat data apparatus. Complementary threat data is provided to the pilot through various presentation methods and to the jammers for electronic countermeasures. Also, threat ambiguity resolution data is provided and back-up data is provided. The presentation methods include video and voice and a tactical electronics countermeasures command is automatically initiated. A multi-pass sensor data correlation algorithm and a threat prioritization algorithm share information with the threat ambiguity resolving algorithm, complementary threat data algorithm, functional sensor back-up apparatus, and electronic countermeasures apparatus. The direction of jamming is determined by data correlation between the radar warning receiver and the CW Jammer.

20 Claims, 15 Drawing Sheets

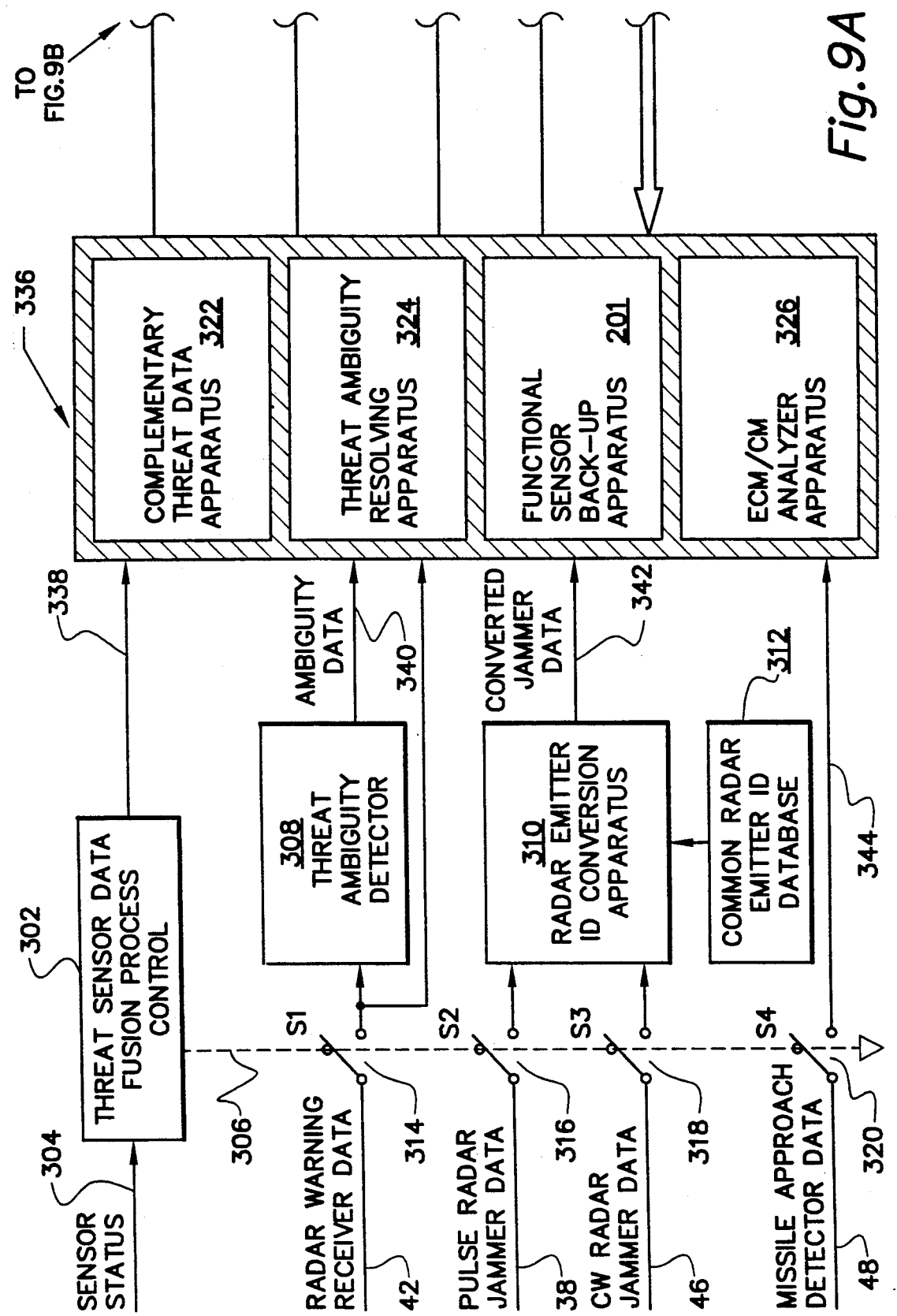

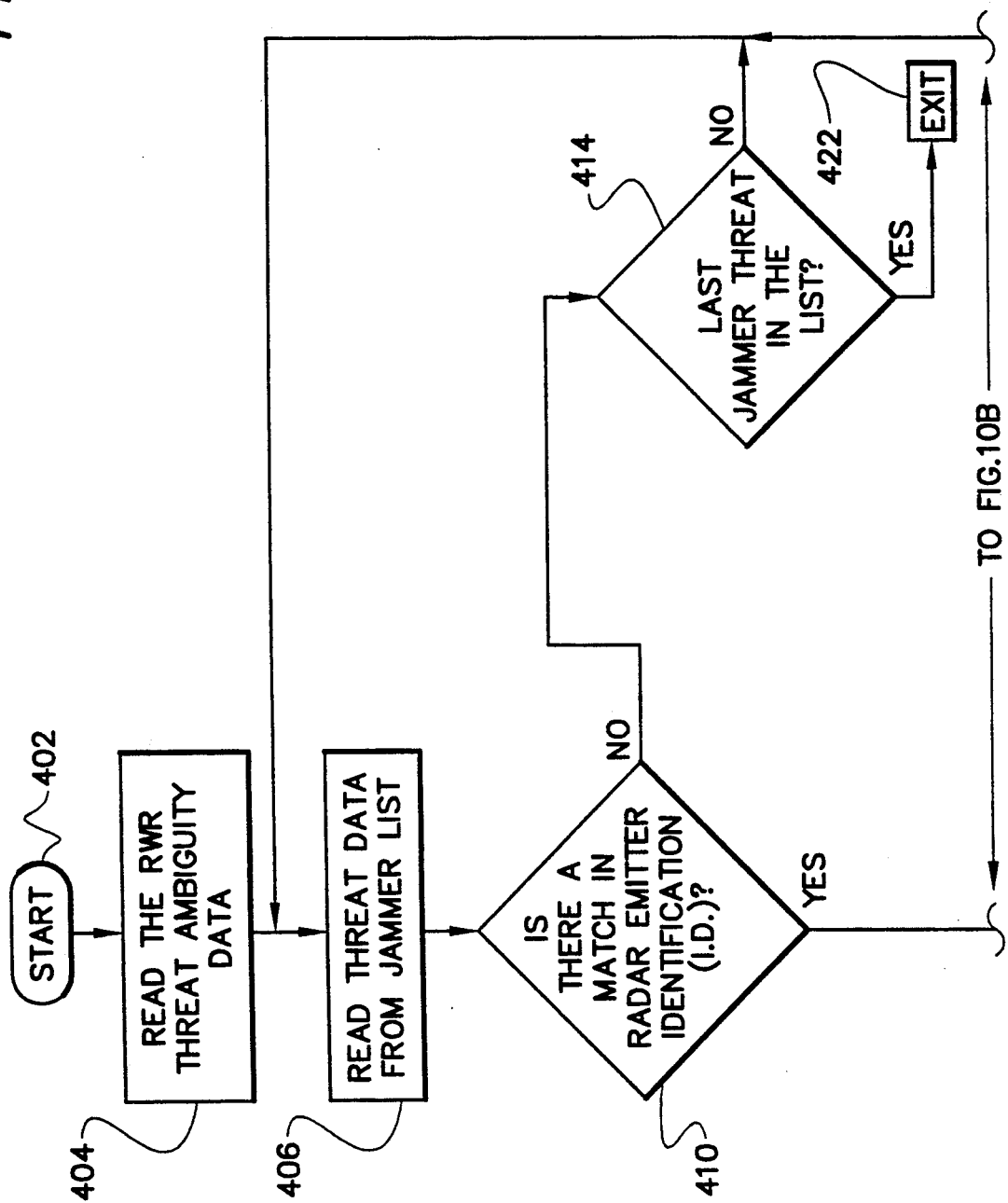

COMPLEMENTARY THREAT SENSOR DATA FUSION METHOD AND APPARATUS

UNITED STATES GOVERNMENT RIGHTS

The United States Government has acquired certain rights in this invention through government Contract No. DAA B07-87-C-H041 awarded by the Department of the Army.

BACKGROUND OF THE INVENTION

1. Field of the Invention

The invention relates to an aircraft survivability system, and more particularly to a complementary threat sensor data fusion method and apparatus.

2. Discussion of the Prior Art

In the prior art, individual aircraft survivability equipment (ASE) sensors are used as stand-alone systems. The use of such systems in a stand-alone manner results in high pilot workloads. Further, in such systems only a limited amount of threat data is presented to the pilot. Data provided by various ASE subsystems such as pulsed radar jammers, continuous wave (CW) radar jammers and missile approach detectors have previously not been used to provide a comprehensive and coherent picture of the threat environment. Thus prior art systems often do not present adequate data in a readily understood format to enable the pilot to quickly and completely assess a given threat environment.

Prior art sensors standing alone in electronics warfare sensor systems suffer a number of drawbacks. Because they are stand alone, the quality of threat identification is not as good as it would be if the sensors were integrated as disclosed in the present invention. The overall threat detection and ability to counter RF guided missiles and to prevent threats is degraded by the stand alone nature of prior art electronic warfare systems. Therefore it is the motivation of the invention to overcome the inherent performance limitations of stand alone electronic warfare sensors by providing a complementary threat sensor data fusion method and apparatus.

SUMMARY OF THE INVENTION

The invention provides a complementary threat sensor data fusion capability for an aircraft survivability system. A set of aircraft survivability sensors provide a threat sensor data fusion control process with status data. The control process controls whether or not a threat ambiguity detector receives radar warning receiver data or a radar emitter ID conversion apparatus receives pulsed radar jammer data or continuous wave radar jammer data. The threat sensor data fusion control process also determines whether missile approach detector data is sent to a countermeasures analyzing apparatus. The threat ambiguity detector provides ambiguity data to a threat ambiguity resolving apparatus. The radar emitter ID conversion apparatus provides converted jammer data to the core functions of the complementary threat sensor fusion apparatus. These core functions include a complementary threat data apparatus, a threat ambiguity resolving apparatus and functional sensor back-up apparatus. The radar emitter ID conversion process receives a common radar emitter ID data base. The threat sensor data fusion process controller also provides fusion process control signal to activate the following apparatus: complementary threat data, threat ambiguity resolving, functional sensor back-up and electronic countermeasures analyzer. Complementary threat data is provided to the pilot through various presentation methods. Also, threat ambiguity resolution data and back-up data is provided. The presentation methods include video and voice. A tactical electronics countermeasures command is automatically initiated. A multi-pass sensor data correlation apparatus and a threat prioritization apparatus shares information with the threat ambiguity resolving apparatus, complementary threat data apparatus, functional sensor back-up apparatus, and electronic countermeasures apparatus.

The invention uses threat data blending concepts to provide these unique capabilities: a) to correctly detect and identify threat weapon systems, b) to coherently combine different sensor data for total threat presentation, c) to provide functional sensor back-up, d) to analyze and queue electronics countermeasures (ECM) information to jammers, and e) to provide automatic RF countermeasures (CM) dispensing.

Other objects, features and advantages of the present invention will become apparent to those skilled in the art through the description of the preferred embodiment, claims and drawings herein where like numerals refer to like elements.

DETAILED DESCRIPTION OF THE PREFERRED EMBODIMENT

Figure 1:
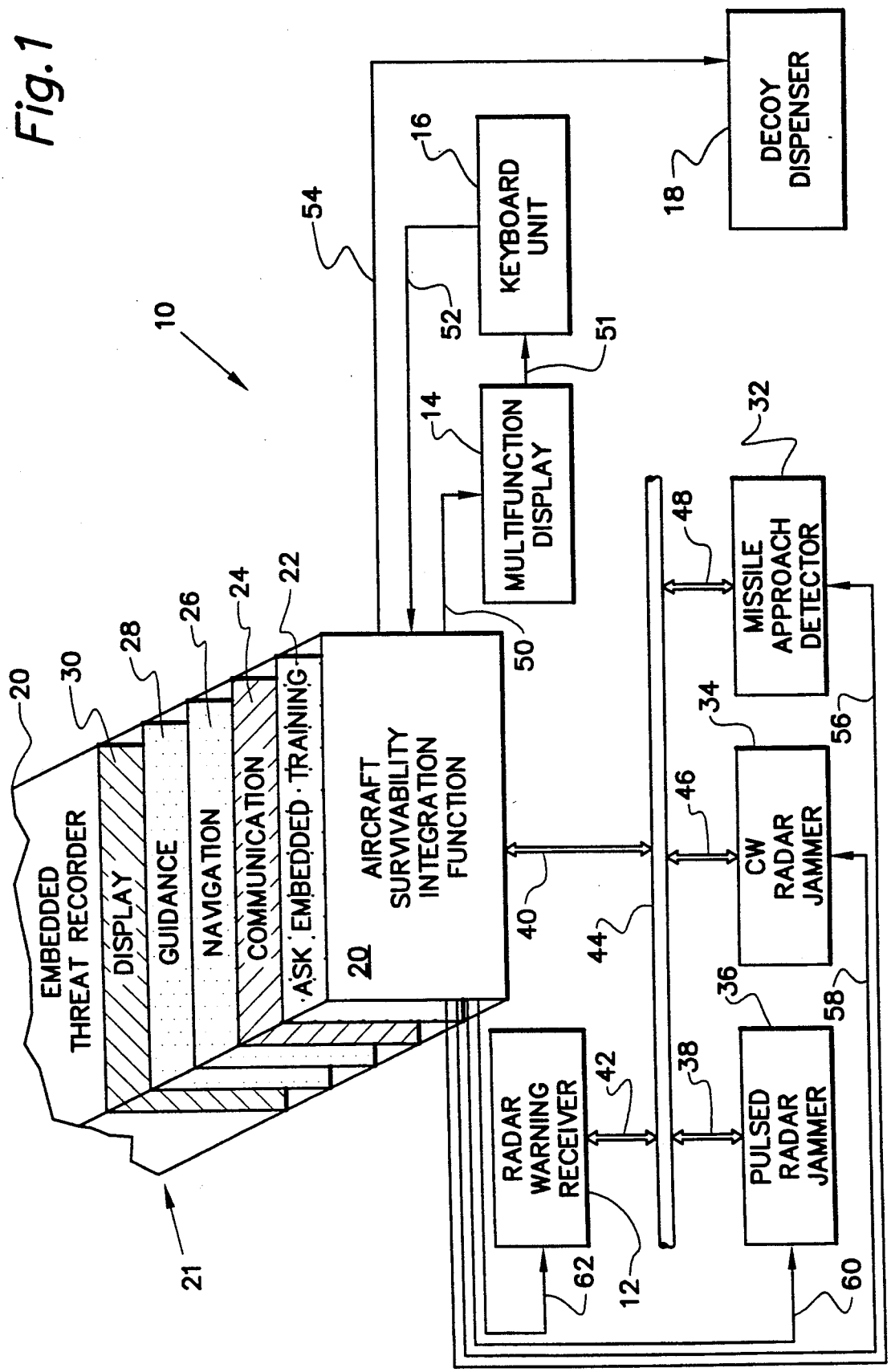
FIG. 1 shows a high level system diagram of one embodiment of the aircraft survivability integration equipment system as employed by the invention.

Now referring to FIG. 1, a high level system diagram of one embodiment of the aircraft survivability integration equipment system 10 as employed by the invention is shown. Aircraft survivability system 10 includes aircraft survivability integration functions 21, a multifunction display 14, a keyboard unit 16, a continuous wave (CW) radar jammer 34, a missile approach detector 32, a pulsed radar jammer 36, a radar warning receiver 12 and a decoy dispenser 18. The aircraft survivability integration functions 21 further include an aircraft survivability integration function 20, an aircraft survivability equipment embedded training apparatus 22, communication apparatus 24, navigation apparatus 26, guidance apparatus 28, display apparatus 30 and an embedded threat data recorder 203. The radar warning receiver 12, pulsed radar jammer 36, CW radar jammer 34, missile approach detector 32, multifunctional display 14, keyboard unit 16 and decoy dispenser 18 are standard units. The radar warning receiver 12, pulsed radar jammer 36, CW radar jammer 34 and missile approach detector 32 all communicate with the aircraft survivability integrated functions 21 through a data bus 44. The data bus 44 may advantageously be a MIL standard 1553 data bus or equivalent. In one example of the invention, the radar warning receiver (RWR) 12 communicates with the data bus through communication lines 42, the pulsed radar jammer 36 communicates with the data bus through communication lines 38, the CW radar jammer 34 communicates to the data bus by communication lines 46, and missile approach detector 32 communicates to the data bus by communication lines 48. In this way, the sensors in the system which comprise the radar warning receiver 12, pulsed radar jammer 36, CW radar jammer 34 and missile approach detector 32 can receive and transmit data to the aircraft survivability integration functions 21. In addition, the aircraft survivability integration functions 21 may be hardwired to the plurality of sensors. This introduction of hardwired lines to the individual sensors provides a redundancy feature in the system which guards against failure of the data bus 44. For example, the radar warning receiver may be wired by lines 62 into the aircraft survivability integration function 20, the 36 lines 60, the CW radar jammer 34 by lines 58 and the missile approach detector 32 by lines 56. Hard wire and bus interfaces are typically provided with such ASE devices as are conventionally available.

The multifunction display 14 is controlled by the display apparatus 30 and is wired to the display apparatus 30 in aircraft survivability integration function 20 by lines 50. The multifunction display also interfaces with the keyboard unit 16, which may be a standard keyboard unit, by lines 51. The keyboard unit 16 is also wired into the communication apparatus 24 by lines 52. Control lines 54 are connected from the ASE integrated functions 21 to the decoy dispenser 18.

Figure 2:
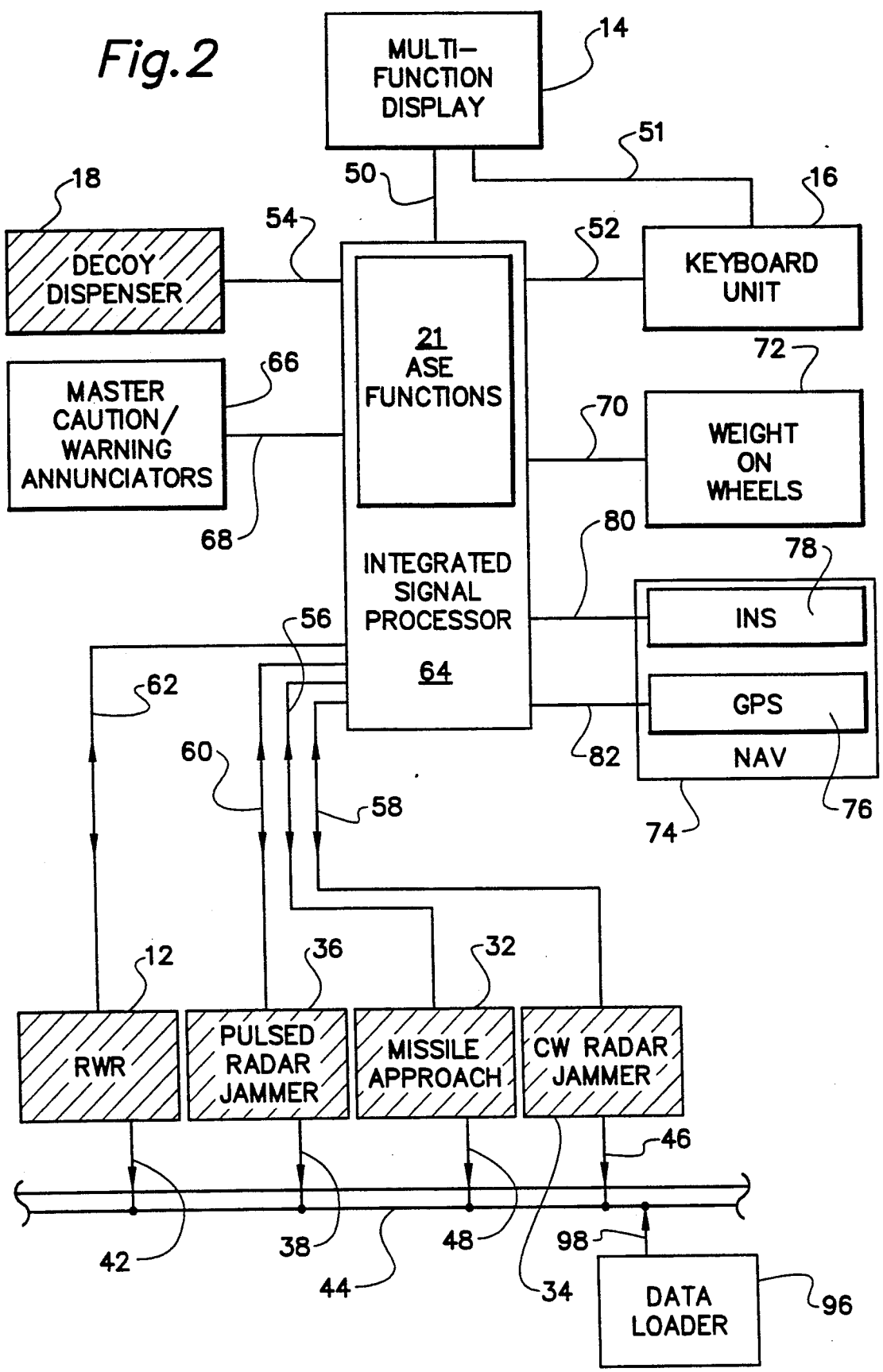
FIG. 2 shows a more detailed block diagram of the aircraft survivability equipment integration system 10 which is integrated into an aircraft survivability equipment/avionics control system (ASE/ACS).

Now referring to FIG. 2, a more detailed block diagram of the aircraft survivability equipment integration system is shown as integrated into an aircraft survivability equipment/avionics control system (ASE/ACS). The aircraft survivability equipment/avionics control system is used to integrate control and display of an ASE suite of devices such as the radar warning detector and jammers as well as selected military communication and navigation systems. Those skilled in the art will understand that the configuration shown in the block diagram of FIG. 2 is one example and does not so limit the invention. In the system shown in FIG. 2, the aircraft survivability integration functions 21 are embedded in an integrated signal processor 64. The integrated signal processor 64 may advantageously comprise a microprocessor, digital signal processor or an equivalent device. Also connected to the integrated signal processor 64 is a master caution/warning annunciator 66 which is connected to the integrated signal processor 64 by line 68, a weight on wheels sensor 72 which is connected by line 70, and navigation systems 74 which are connected by lines 80 and 82. The navigation equipment advantageously includes an inertial navigation system (INS) 78 and a global positioning system (GPS) 76. A data loader 96 is connected via lines 98 to bus 44. The data loader 96 is a conventional data loader and may be used to input flight information and other parameters into the signal processor 64 prior to an aircraft embarking on a particular flight plan. The other components are as shown in FIG. 1 and operate similarly. Those skilled in the art will recognize that the ASE equipment including the radar warning sensor, jammers and missile approach detector are well known standard units.

The weight on wheels sensor 72 is a known sensor which communicates with the signal processor 64 and provides an enable signal 70 which enables certain built-in test functions to be performed when the aircraft is on the ground. These built-in test functions may be a part of the radar warning receiver 12, the pulsed radar jammer 36, the missile approach detector 32 and the continuous wave radar jammer 34.

The integrated signal processor 64 also serves as a bus controller using well known control signals. The four ASE subsystems, RWR 12, pulsed radar jammer 36, missile approach detector 32 and CW radar jammer 34 may be advantageously configured as remote terminals.

The ASE/ACS system provides a fail active state with regard to the ASE suite. If, for example, the integrated signal processor 64 should fail, or power is removed from the unit, the ASE subsystems may assume their most active states. The ability to fire flares and chaff is not impaired by a data bus failure in this redundant configuration. In order to insure this, flare and chaff fire switches are wired directly into the decoy dispenser 18 and are not controlled by the ASE/ACS in the event of a data bus failure. In the alternative, the decoy dispenser 18 may be fired automatically through the aircraft survivability integration functions 21 when appropriate signals are received from the subsystem sensors, such as the missile approach detector and the radar warning receiver.

An aircraft survivability sensor may have certain limitations due to such elements as weather, electromagnetic interference (EMI), clutter, obscurant, or electronic compatibility (ECM), the performance of another sensor may be used to offset its weakness thereby improving the performance of the sensor suite.

The invention utilizes data conversion, data correlation, and functional sensor back-up techniques. The data conversion technique converts all possible radar emitter identifications generated by the jammers to a common radar ID's base. The data correlation technique parametrically correlates the convertible threats generated from jammer data with that of the Radar Warning Receiver (RWR). The functional sensor back-up technique provides graceful sensor degradation in the event a sensor failure occurs.

To improve the quality of threat identification by the RWR, threat data generated by the jammers are converted and used in a parametric data correlation to resolve any RWR threat ambiguity. The design is also based on these concepts to provide new and unique capabilities to the sensor suite such as complementary threat generation, queueing electronics countermeasures (ECM) information to the jammers, functional sensor back-ups, and automatic RF countermeasures (CM) dispensing.

Figure 5:
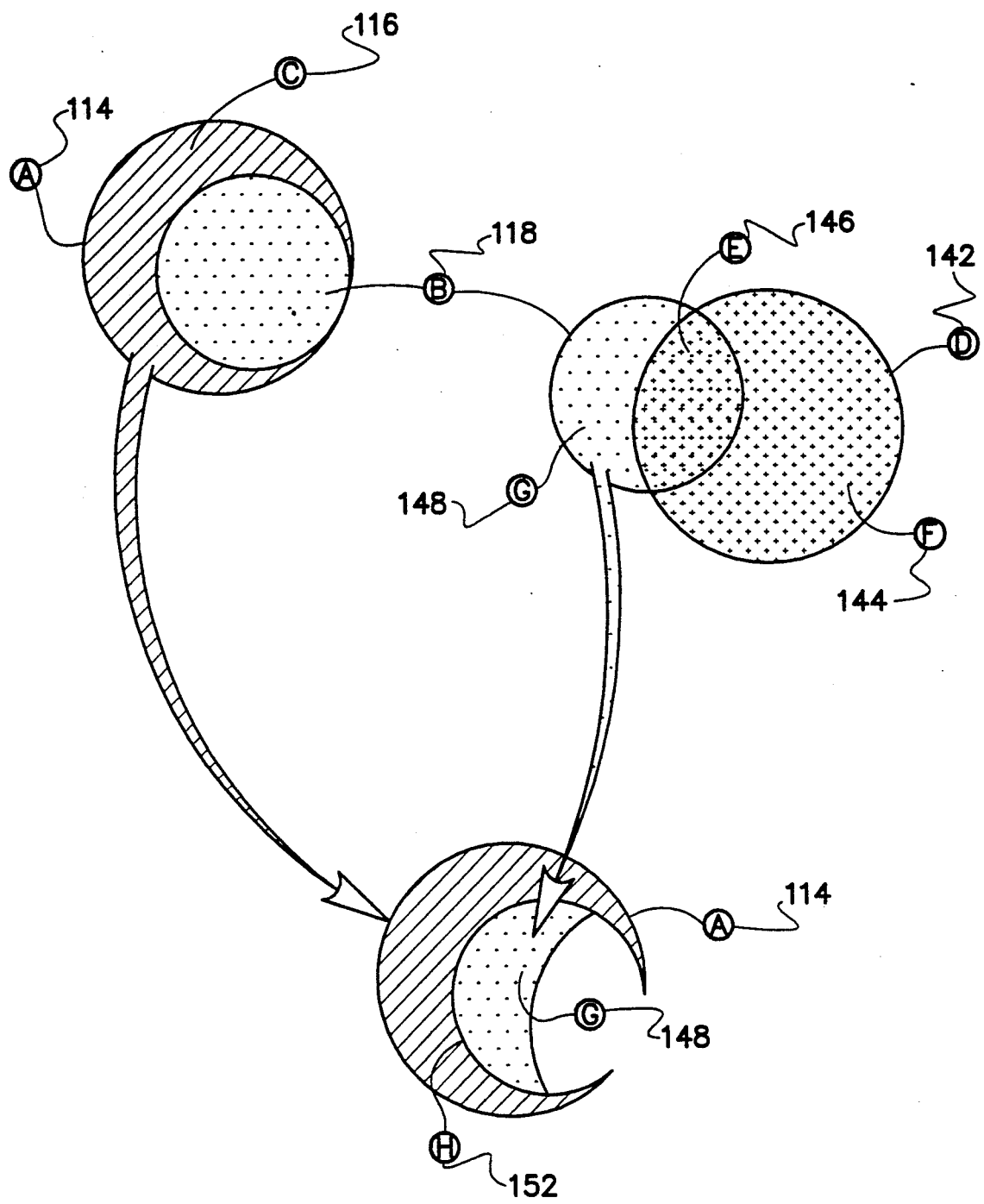
FIG. 5 shows a data flow diagram showing the various data sets of the invention in a Venn diagram fashion.

Complementary threats are defined as a set of threats which are comprised of threats being unique to the jammers or the un-correlated threats between the jammers and the RWR as illustrated in FIG. 5.

Figure 6A:
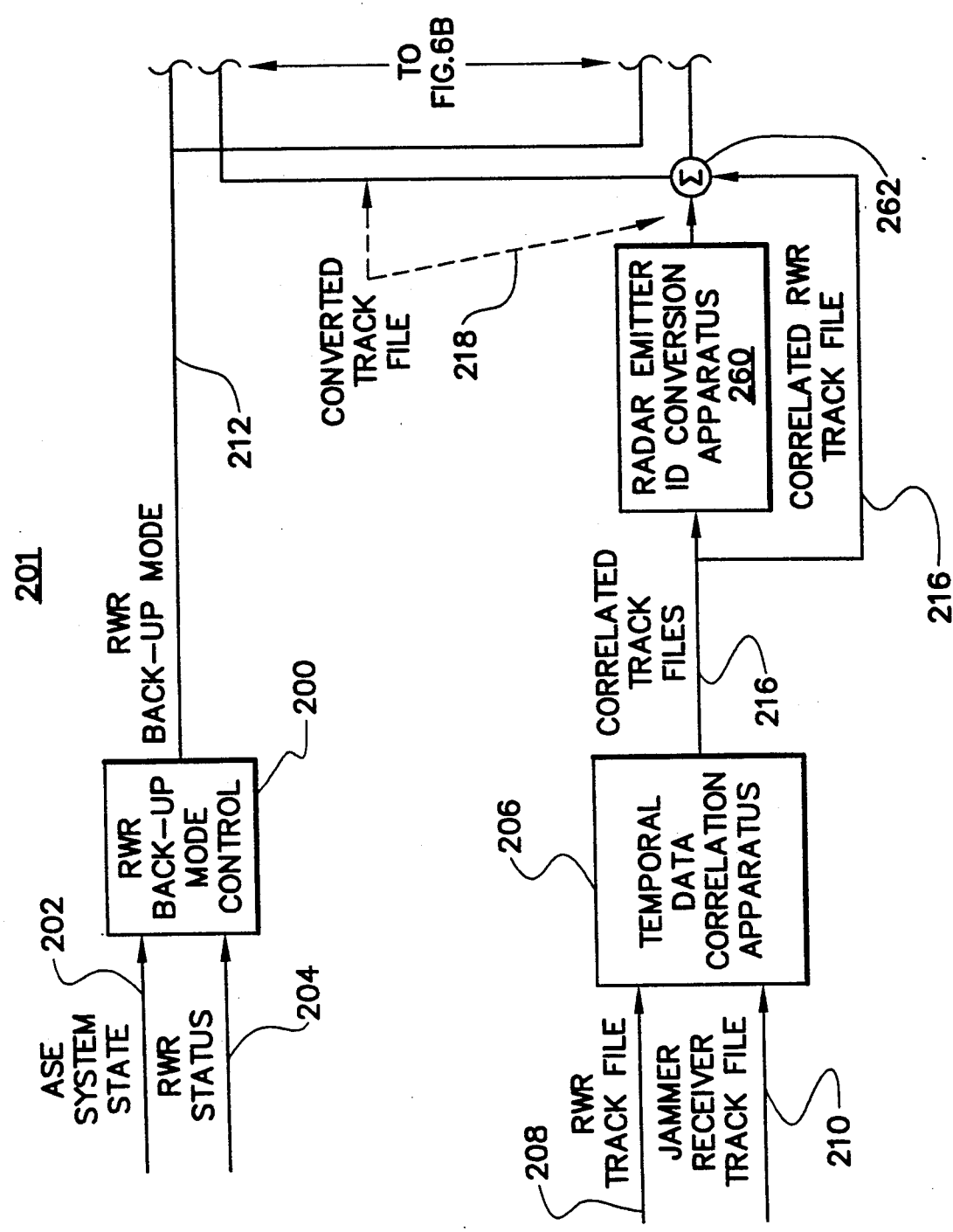
FIGS. 6(a),(b) show a schematic block diagram for the functional radar warning receiver back-up generator.
Figure 6B:
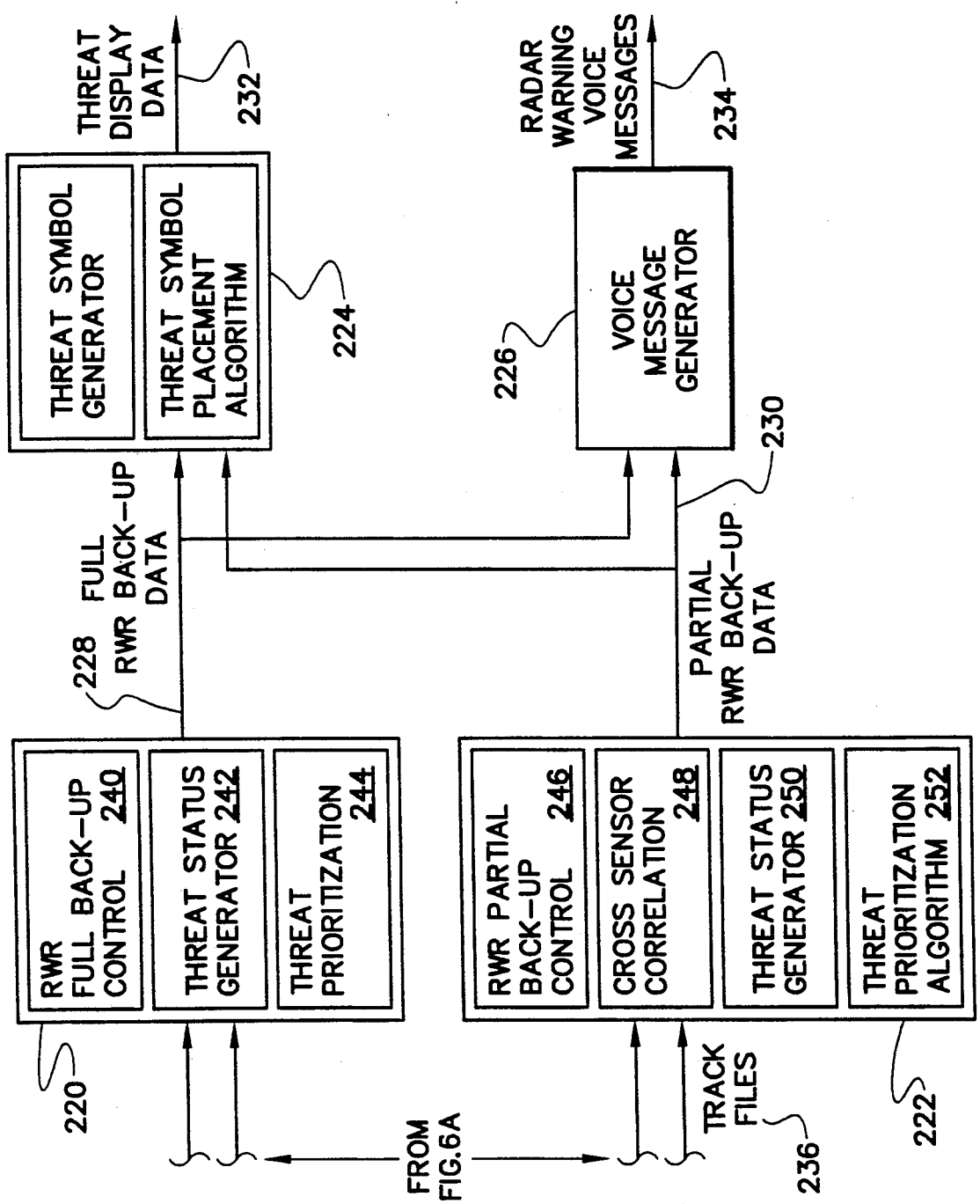
Figure 7:
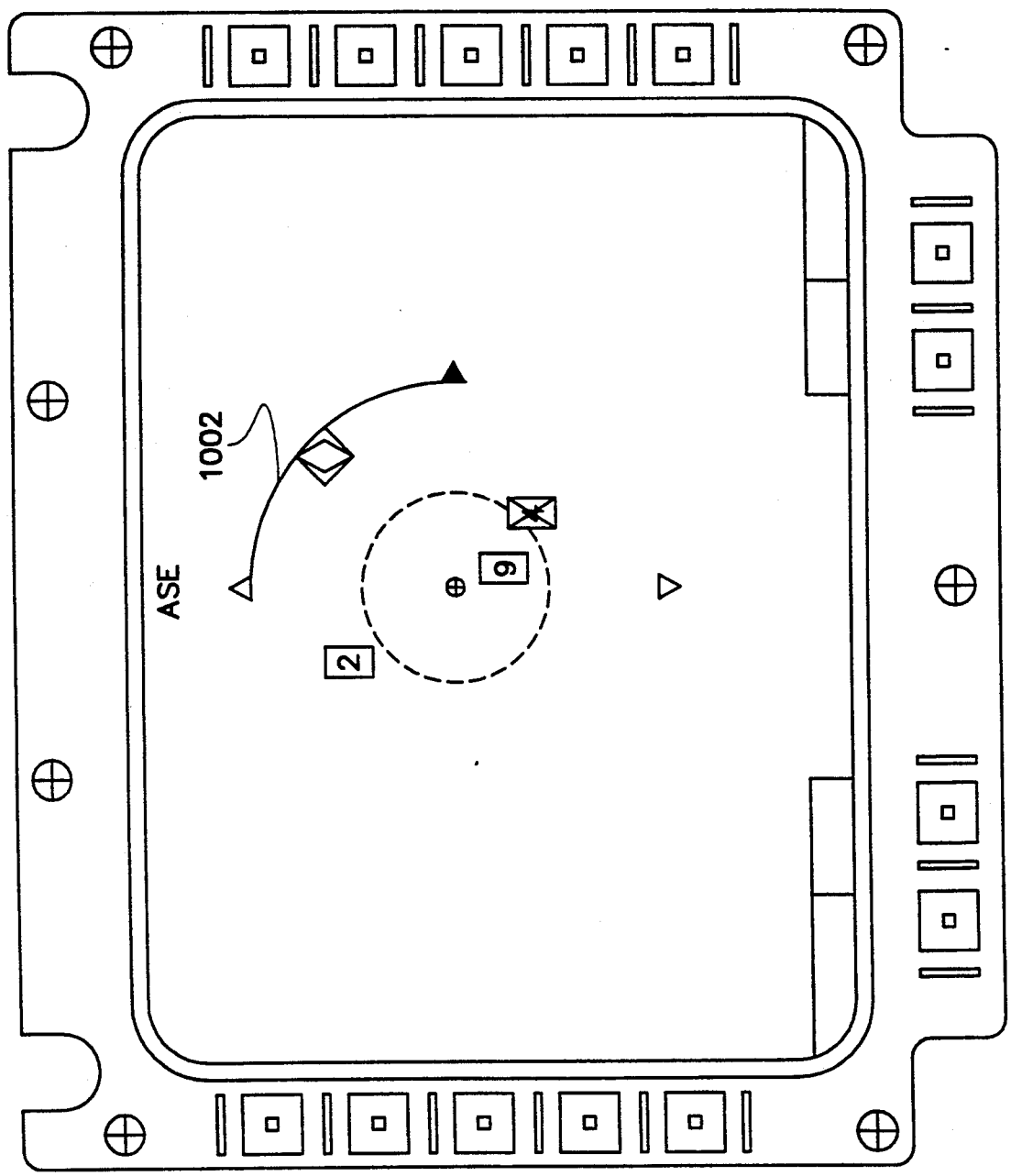
FIG. 7 shows a display diagram for the partial radar warning back-up first quadrant.
Figure 8:
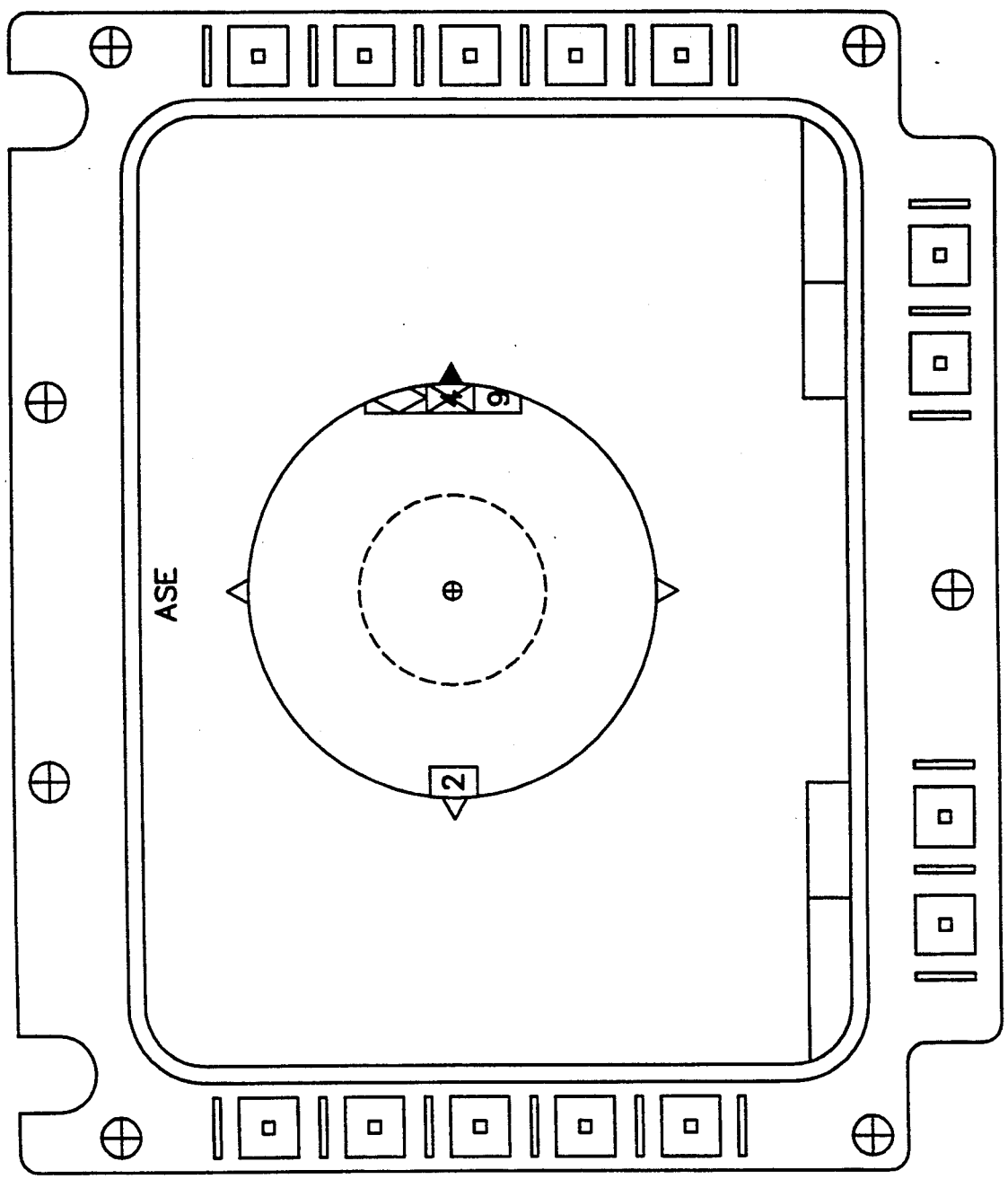
FIG. 8 shows a display diagram for the radar warning receiver full back-up threat display.

In the event the RWR loses some or all of its threat detection capability, the functional sensor back-up will automatically provide either partial or full functional back-up as illustrated in FIGS. 6, 7 and 8.

Figure 9B:
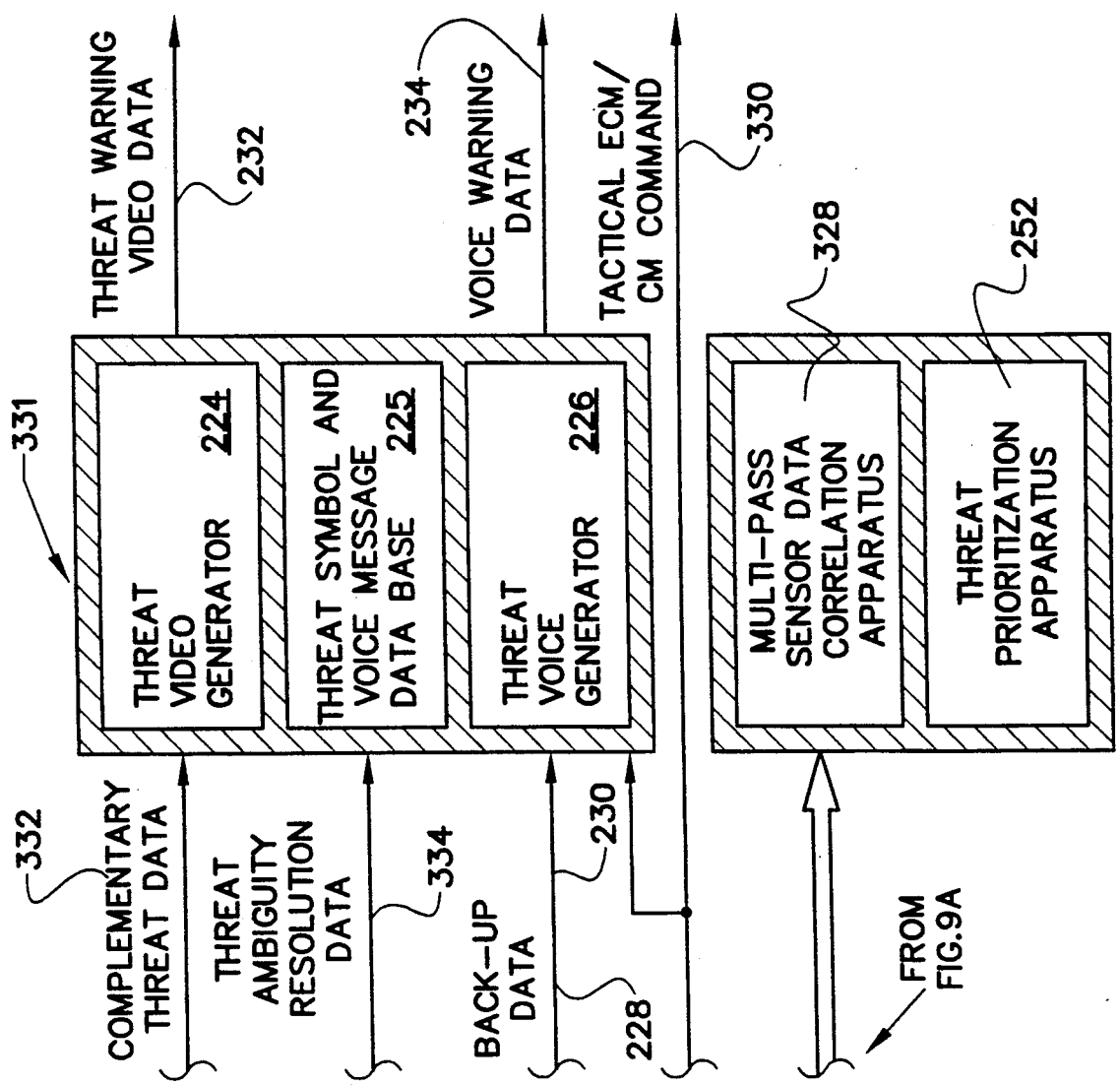
FIGS. 9(a),(b) show a schematic block diagram for the complementary threat data fusion apparatus of the invention.

Now referring to FIG. 9 which shows the complementary threat sensor data fusion apparatus of the invention. The complementary sensor data fusion apparatus contains eleven different elements and two data bases. A threat sensor data fusion process control 302 is provided with a sensor status input 304. The threat sensor data fusion process control apparatus 302 provides a fusion control process signal 338 to a complementary threat data apparatus 322 threat ambiguity resolving apparatus 324, functional sensor back-up apparatus 201 and ECM/CM analyzer apparatus 326. The complementary threat data process 322 provides a complementary threat data signal 332 to a threat video generator 224, a threat symbol and voice message data base 225, and a threat voice generator 226. The threat sensor data fusion process controller 302 also provides a sensor data control signal 306 to provide a logical control of the sensor data. The sensor data control signal 306 controls switch 314 which provides radar warning receiver data on line 42 to the threat ambiguity detector apparatus 308. The ambiguity detector apparatus 308 provides ambiguity data 340 to a threat ambiguity resolving apparatus 324. The threat ambiguity resolving apparatus 324 provides threat ambiguity resolution data 334 to correct data presentation.

The threat sensor data fusion process controller 302 controls switch 316 which provides pulsed radar jammer data 38 to the radar emitter ID conversion apparatus 310. The radar emitter ID conversion apparatus 310 provides converted jammer data 342 to the functional sensor back-up apparatus 201. The threat sensor data fusion process controller 302 also switches continuous wave radar jammer data 46 through switch 318 to radar emitter ID conversion apparatus 310. The radar emitter ID conversion process apparatus 310 also provides common radar emitter ID's from the common radar emitter ID data base 312. Radar emitter ID conversion apparatus 310 provides converted jammer data 342 to the complementary threat data process 322, the threat ambiguity resolving apparatus 324, the functional sensor back-up apparatus 201 and ECM/CM analyzer apparatus 326.

The functional sensor back-up process backs-up data which can be either full back-up data 228 or partial back-up data 230 to a threat voice generator 226, threat symbol voice and message database 225 or threat video generator 224.

The threat sensor data fusion process controller apparatus 302 also provides missile approach detector data on line 48 through switch 320 to the electronic countermeasures apparatus 326.

The output device of the invention 331 provides threat video generation 224, threat symbol and voice message data base generation 225, and threat voice generation 226. The threat warning video data is provided on signal line 232 and the voice warning data 234 is provided to the pilot. A tactical electronics countermeasures/countermeasures command signal is provided on signal line 330 by the ECM/CM analyzer 326.

A multi-pass sensor data correlation apparatus 328 is provided correlated/uncorrelated data for the apparatus 336. A threat prioritization algorithm 252 is also employed which shares data with the other ASE apparatus.

The threat sensor data fusion process control apparatus 302 monitors the operational status and sensor operational mode 304 to set control states for sensor data control and fusion process control. The sensor data control signal 306 controls the gateways of the input data through the relay switches 314, 316, 318 and 320. The fusion process control signal 338 is used to regulate the processing in the complementary threat data apparatus 322, threat ambiguity resolver apparatus 324, functional sensor back-up apparatus 201, and the ECM/CM Analyzer apparatus 326.

The threat ambiguity detection apparatus 308 monitors the RWR data on line 42 to determine threat ambiguity cases. If a threat ambiguity case exists, the function 308 will determine the pair of threats associated with this case. Threat data will then be extracted and passed on to the threat ambiguity resolver apparatus 324.

The radar emitter ID conversion apparatus 310 receives threats provided by the pulsed radar jammer (PRJ) 36 and the CW radar jammer (CWJ) 34. These threats have radar emitter ID's unique to those sensors. These ID's must be converted to the common radar emitter ID base of the radar warning receiver prior to further processing. This process performs the ID conversion based on the data contained in the common radar Emitter ID data base 312. Any radar jammer threats which do not correlate to a threat in the common ID data base 312 are tagged as unique to the jammers as described in FIG. 5.

The common radar emitter ID data base 312 contains a cross-reference of all possible radar emitter identifications between the radar warning receiver and the jammers.

The complementary threat data apparatus performs a series of cross-sensor data correlations in order to perform two critical functions. First, threat data from the PRJ 36 and the CWJ 34 is correlated with that of the RWR 12 to develop a more complete presentation of threat RF activity. To accomplish this, un-correlated and unique threats from the radar jammers are combined to be presented as complementary threats. The un-correlated threats are those which are detectable by both jammer and RWR, but for some reason have only been detected by the jammer. Unique threats are those which are only detectable by the jammer, hence they would not be in the RWR emitter identification list. The second function is to determine the jamming status for those threats detected by the radar warning receiver.

The threat ambiguity resolver apparatus 324 resolves threat ambiguities. A threat ambiguity occurs when the RWR is unable to positively identify a threat signal from among two or three possibilities. This is unlike "unknown detection" when the RWR does not recognize the threat signal at all. In the event a threat ambiguity is detected, threat data available from the Jammers is used to revolve the RWR ambiguities and the RWR display is corrected.

The functional sensor back-up apparatus exploits the overlapping capability in the threat detection and identification in the RWR and the jammers. Functional sensor back-up can be provided in the event of a sensor failure. For instance, if the radar warning receiver loses some or all of its detection capability, this algorithm will provide functional back-up to provide radar warning based on the threat data provided by the jammers.

The ECM/CM Analyzer apparatus 326 performs two functions. The first function analyzes the effectiveness of the jamming techniques used by the jammers against operational radar weapon systems. Subsequently, this information will pass back to the jammers in the form of queueing to improve the jammer response time. The second function correlates RF activities from the radar warning receiver and radar jammers with region approach data from the missile approach detector to determine when to dispense RF decoys countering an RF-guided missile threat.

The multi-pass sensor data correlation apparatus 328 determines if a jammer and RWR radar emitter ID match occurs in a region, if so, the frequency and/or PRI is correlated. If these parameters correlate, the two emitter ID's are declared to be a single threat.

The threat prioritization apparatus 252 prioritizes complementary threats and back-up threats based on predetermined prioritization rules before passing threats on to the video and voice generators.

The threat video generator apparatus 224 generates threat symbols to present on the multi-function display 14 (MFD). This function determines threat symbol, method of presentation, and threat placement based on a number of variables such as threat type, threat detection status, threat mode, and the threat group such as RWR threats, complementary threats, and back-up threats.

The threat voice warning generator 226 processes the threat data to generate radar warning messages based on a set of defined rules.

The threat symbol and voice message data base 225 contains threat symbols and voice messages to accommodate all detected threats.

Figure 3:
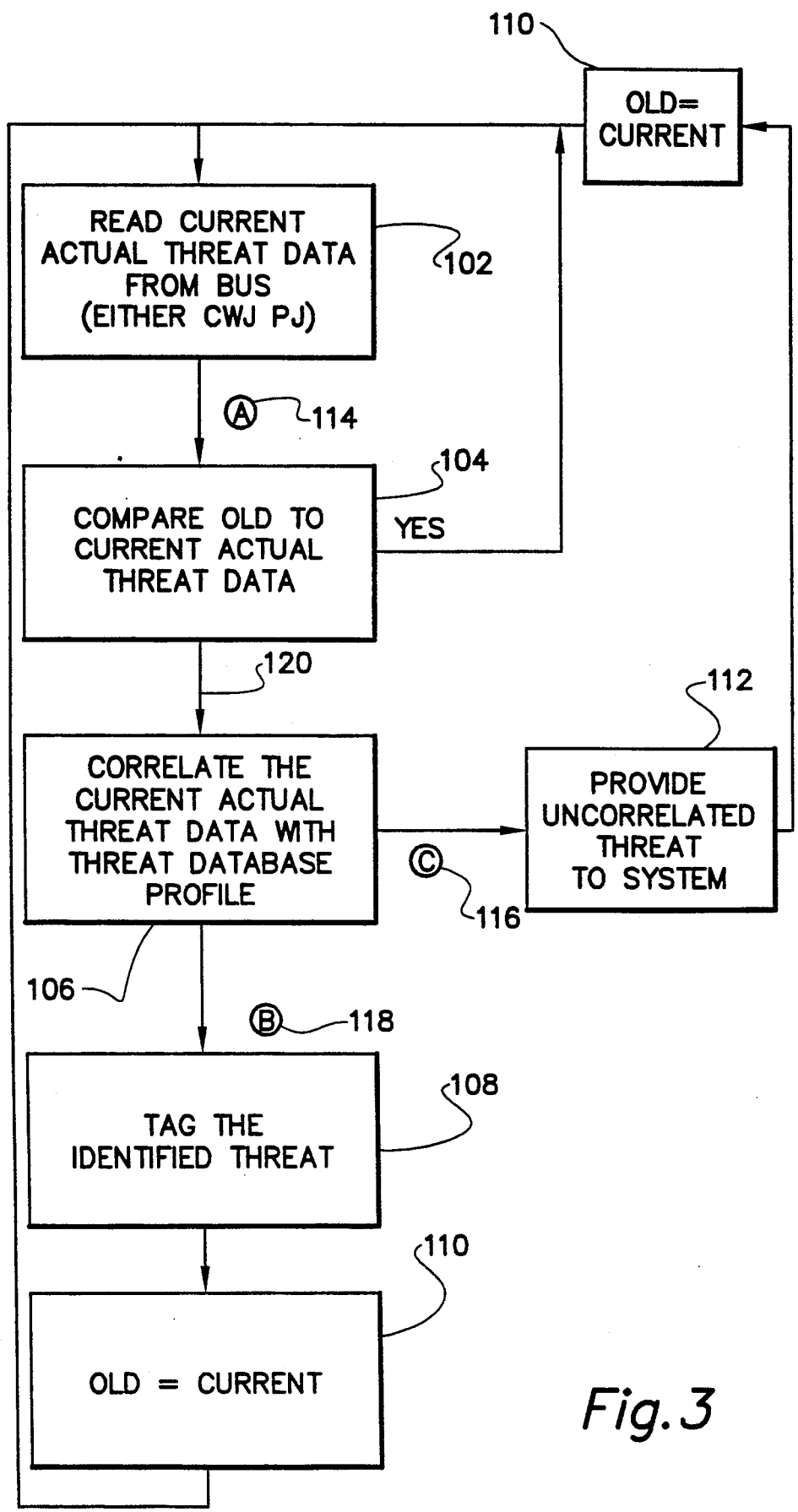
FIG. 3 shows a method of the invention that is used to convert the current actual threat data, that is sent to the system bus from either the continuous wave radar jammer or the pulsed radar jammer, to either an un-correlated threat or an identified threat.

Now referring to FIG. 3 which shows the method of the invention used to convert current actual threat data from the system data bus from either the continuous wave radar jammer 34 or the pulsed radar jammer 36 to either an un-correlated threat or an identified threat. The threat data base is composed of a number of subelements and parameters. A threat data base may be input into the system and stored in memory by any well-known means. The threat data base advantageously contains threat parameters including threat types which include, in one preferred embodiment of the invention, a missile, anti-aircraft gunfire, a fighter, or other threats identified by the aircraft. Each threat type has an associated set of parameters which, in one preferred embodiment of the invention, include frequency of the threat signal, amplitude of the threat signal, pulse repetition frequency, pulse repetition interval, angle of arrival, and operational mode of the threat. Those skilled in the art will recognize that other parameters may be used in the method of the invention. Those skilled in the art will recognize that either all the parameters may be included in the threat data base or just a few. The threat data base comprises a profile of known threats that may be encountered by the aircraft.

FIG. 3 shows the processing of data from a current actual threat as read from the jammer radars. The threat data is provided on the data bus 44 as shown in FIGS. 1 and 2. The process of the invention starts at step 102 wherein the current actual threat data from the data bus is read. This data is also available directly to the system processor 64 from the hardwire connections 58, 60 and from the radar jammers 34, 36. Those skilled in the art will recognize that the bus method of communication provides more robust threats. The process flows to step 104 where previously received old threat data is compared to just received current actual threat data. Step 104 compares on a logical basis the old detected threat and the current detected threat. The comparison of different threat data occurs in different time slices. The old threat data occurred at the last sample period as indicated in step 110. The comparison of the various threat data parameters can occur either through known accepted methods such as boolean comparisons or threshold comparisons which compare an upper bound to a lower bound of the parameters, or a comparison of whether or not the parameters are within a window of parameter values. Alternate methods of comparison understood by those skilled in the art may be used such as fuzzy logic-based comparisons. The process flows to step 106 if the system is in a state that indicates the old and the current actual threat data is not the same. At step 106 the process correlates the current actual threat data with threat profiles from the threat data base. In one preferred embodiment of the invention, the current actual threat is compared against each element of the threat data base using the comparison methods used in step 104. If the threats correlate and match up as indicated by state 126, the process flows to step 108 where the identified threat is tagged. The process then flows to step 110 to set the old actual threat data to equal the current actual threat data. The process then returns to step 102.

In one example of the method of the invention the processor creates different sets of data which are correlated as shown in FIG. 5 which is described in detail below. At step 102, the process takes data from one of the radar jammers which is designated as data set A 114. In step 106, a data set labeled C 116 is generated which represents an uncorrelated current actual jammer threat data. This data is presented to process step 112 to provide un-correlated threat data to any system using the method of the invention. The process then flows to step 110 which sets the old threat data to the current threat data. Next, the process returns to step 102. The process step 106 generates a data set called B 118 which is the matched-up correlated current actual jammer threat data. If in process 104 the comparison to check old threat data against current threat data results in the old and the current being the same, then the process flows to step 102 to read the next current actual threat data from the bus or from the hardwired system.

Figure 4:
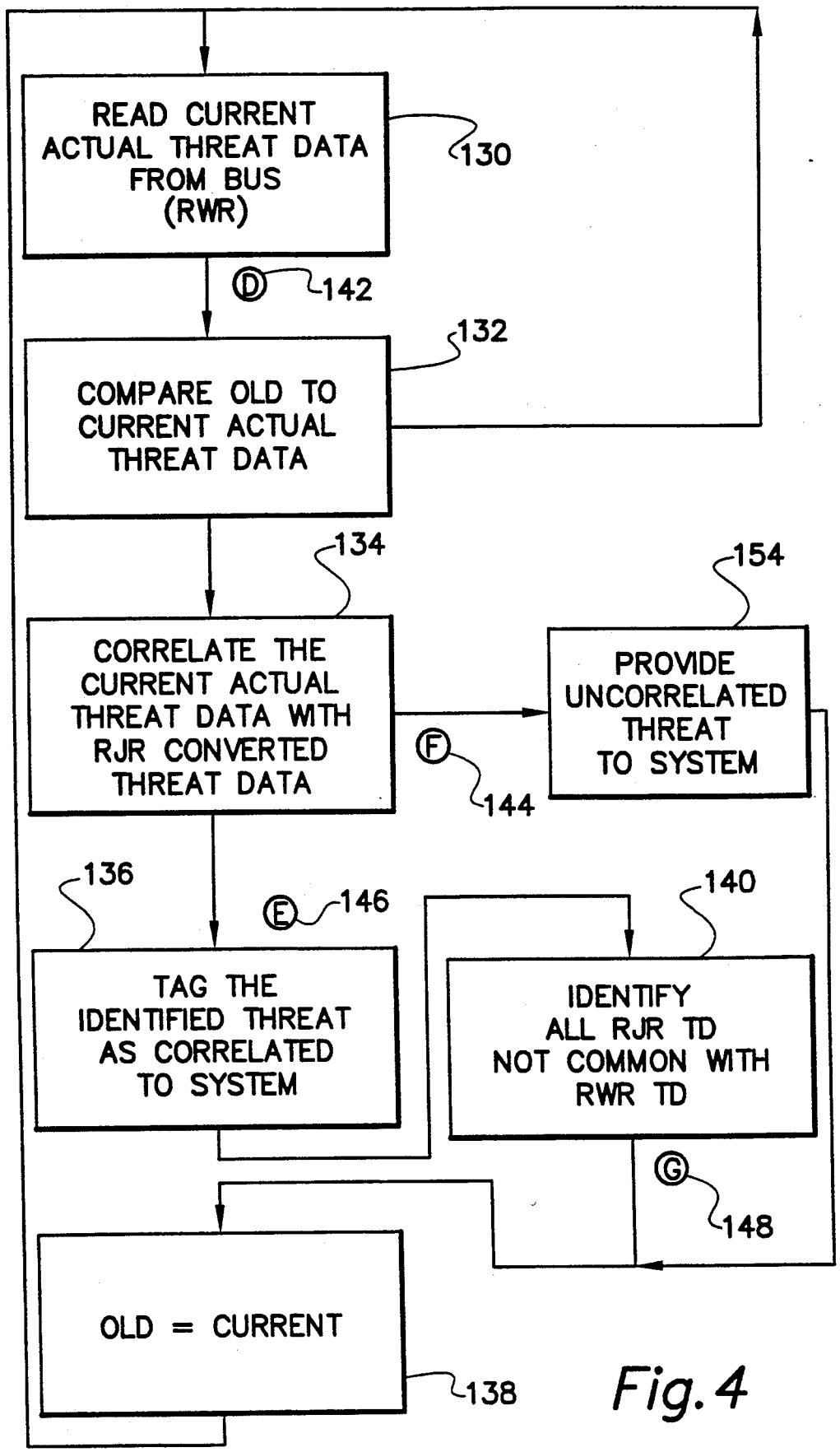
FIG. 4 shows one method of the invention used to perform data correlation on radar warning receiver data.

Referring now to FIG. 4, the method of the invention used to perform data correlation on radar warning receiver data is shown. The process starts at step 130 where the current actual threat data from the radar warning receiver is read from the data bus. The process 130 generates data set D. Data set D is then used by process step 132 to compare the current actual threat data with old threat data from the radar warning receiver. If the two threats are identical (i.e. the old and the current in step 132), the process returns to step 130 to read another actual threat. Step 130 reads in all available threats from the radar warning receiver. The set of all possible threats is commonly known as a threat set.

In step 132, the old threat set is compared against a current actual threat set data. If the current actual threat set data is not a new threat set, then the process flows to 130 to scan another set of threats. In step 132, if there is a new threat, the process flows to step 134 to correlate the current actual threat set with the radar jamming receiver converted at threat data which is generated in FIG. 3. The threat data is indicated by set B. If the converted threat data set B correlates with the current actual threat data set, then the process flows to 136 to tag the identified threat set as a correlated new threat to the system using the method of the invention. The process then flows to step 140 where the process identifies a set G 148 which is all radar jamming receiver threat data that is not common with the radar warning receiver threat data. The process then flows to step 138 to set the old threat data set as the current threat data set for the next comparison and the next time cycle. The process then flows to 130 to read the next current actual threat data set from the bus.

If in step 134 there is no correlation between the current actual threat data set with the radar jamming receiver converted threat data set, the process flows to step 154, generates an un-correlated threat set F 144, and provides the un-correlated threat set to the system using the method of the invention.

As is the case with the jammer data, when implementing the method of the invention to convert the current actual threat data set from the radar warning receiver to either a correlated or un-correlated threat, the process creates various other data sets. Data set D 142 is the current active threat data set from the bus. Data set E 146 is the correlated current actual threat data with the radar jamming receiver converted threat data. Data set F 144 is the un-correlated data. Data set G 148 is the data which is not common with the radar warning receiver threat data.

Now referring to FIG. 5, a data flow diagram showing the various data sets of the invention in a Venn diagram fashion is shown. Data set A 114 is the current actual jammer threat data. Data set B 118 is the correlated current actual jammer threat data or the converted set data. Data set C 116 is the un-correlated actual jammer threat data. Data set D 142 is current actual radar warning receiver threat data. Data set E 146 is the common current threat data. Data set F 144 is the un-correlated radar warning receiver threat data. Data set G 148 is the radar jamming receiver threat data which is uncorrelated with the radar warning receiver threat data. Data set G is used subsequently to generate a complementary threat set H 152. Data set H 152 is the complementary threat data set which represents the summation of data sets C 116 and G 148.

The two basic processes shown in FIG. 3 and FIG. 4 are joined in this data flow diagram of FIG. 5. Two basic data sets include the data from the radar jamming receivers which is data set A 114, and the radar warning receiver which is data set D 142. The process of FIG. 3 generates the data set B 118 which represents all correlated current actual jammer threat data sets. This is used by both processes shown in FIG. 3 and FIG. 4 to create a complementary threat. The data set B 118 is subtracted from data set A 114 to generate data set C 116 which is the un-correlated current actual jammer threat data. Data set B 118 is also used along with the data set D 142 (current actual radar warning receiver threat data) to generate the intersection of the two data sets E 146. The data set E 146 is the common current threat data. The common current threat data is then subtracted from data set B 118 to generate a new data set G 148. Data set G 148 represents the radar jamming receiver threat data that is not common with the radar warning receiver threat data. That is, data set G 148 represents data from threats which are detected by the jammers, but not the radar warning receiver. Data set G 148 and data set C 116 are combined to create data set H which is called the complementary threat data. The complementary threat data set H comprises threats that are complementary to the already identified threats which have been identified by the radar warning receiver.

Now referring to FIG. 6 which shows a functional radar warning receiver back-up generator schematic block diagram. The ASE system state 202 is provided as an input to the radar warning receiver back-up mode control apparatus 200. The radar warning receiver status signal 204 is also provided as an input to the radar warning receiver back-up mode control apparatus 200. The radar warning receiver back-up mode control apparatus 200 has as an output the radar warning receiver back-up mode signal 212. This signal is provided to the functional radar warning receiver generator full back-up apparatus 220.

The full back-up apparatus 220 has three subfunctions. The first subfunction is a radar warning receiver full back-up control apparatus function 240. The second subfunction is the threat status generator function 242. The third subfunction is the threat prioritization function 244. The full back-up apparatus 220 has a full radar warning receiver back-up data signal 228 as an output. The full back-up apparatus 220 also has an input a converted track file 218.

The converted track file 218 is provided by the radar emitter conversion apparatus 260. The converted track file is also summed through summation junction 262 which sums a correlated radar warning receiver track file 216 with the output of the radar emitter ID conversion apparatus 260. The radar emitter ID conversion apparatus 260 has as an input the correlated radar warning receiver track file 216. The correlated radar warning receiver track file 216 is provided by the temporal data correlation apparatus 206. Temporal data correlation is provided for the radar warning receiver track file 208 and the jammer receiver track file 210.

The partial back-up apparatus 222 is provided with the radar warning receiver mode signal 212 and the summed output signal track files 236 which is the sum of the output of the radar emitter ID conversion apparatus 260 and the correlated radar warning receiver track file 216. The partial radar warning receiver back-up apparatus 222 is composed of four subfunctions. The first subfunction is the radar warning receiver partial back-up control function 246. The second subfunction is the cross sensor correlation function 248. The third subfunction is the threat status generator function 250, and the fourth subfunction is the threat prioritization algorithm 252.

The partial back-up apparatus 222 provides a partial radar warning receiver back-up data signal 230 which is provided to two output apparatus. The first apparatus is the voice message generator 226 which produces radar warning voice messages 234. The second apparatus is the back-up display apparatus 224 which provides threat symbol generation along with threat symbol placement. The output of the display apparatus 224 is a threat display data signal 232.

The invention provides a functional RWR back-up capability based on functional redundancy. Radar warning receiver information such as radar detection data and radar identification data exists between the Radar Warning Receiver 12, the Pulsed Radar Jammer 36, and CW Radar Jammer 34. The present invention provides an automatic back-up for both the voice and video functions of the Radar Warning Receiver. When an automatic back-up is provided the system loses some of the threat coverage capability as indicated by the RWR system status or if the RWR system becomes inoperative.

The Functional RWR Back-up Generator apparatus of the invention is operated in two different modes: Partial RWR Back-up mode and Full RWR Back-up mode. If the RWR system indicates that one or more isolated receivers have failed on RWR status line 204, then a RWR back-up function generating the partial RWR Back-up data is activated by partial back-up apparatus 222. Otherwise, if the RWR is either inoperative or not installed, then the function generating the full RWR back-up data is activated. Track files generated by the Radar Warning Receiver 12, Pulsed Radar Jammer 36, and CW Radar Jammer 34 are processed by a Temporal Data Correlation apparatus 206 and a Radar Emitter ID Conversion apparatus 260 before being passed on to specific back-up functions.

Referring now to Table A which shows a correspondence between the quadrant of the radar warning receiver which has failed in the first column and the set of data used to provide the back-up data from the jammer hemispheres A and B and the surviving radar warning receiver quadrants 1, 2, 3 and 4.

TABLE A

| Correspondence | Failed Quadrant | Set Operations |
|---|---|---|
| 1 | 1 | (B-4) |
| 2 | 2 | (A-3) |
| 3 | 3 | (A-2) |
| 4 | 4 | (B-1) |
| 5 | 2, 1 | (A-3) and (B-4) |
| 6 | 3, 1 | (A-2) and (B-4) |
| 7 | 4, 1 | B |
| 8 | 3, 2 | A |
| 9 | 4, 2 | (A-3) and (B-1) |
| 10 | 4, 3 | (A-2) and (B-1) |
| 11 | 3, 2, 1 | A and (B-4) |
| 12 | 4, 2, 1 | (A-3) and B |
| 13 | 4, 3, 1 | (A-2) and B |
| 14 | 4, 3, 2, 1 | A and B |

The first correspondence backs up failed quadrant 1 of the radar warning receiver by providing set B from the radar jammer less set 4 from the radar warning receiver. Likewise, correspondence 2 provides back-up data for the failed quadrant 2 of the radar warning receiver by subtracting the radar warning receiver set 3 from the jammer set A. Correspondence 5, for instance, provides back-up for failed quadrants 2 and 1 from the radar warning receiver by "summing" the first subset, set A of the radar jammer less the third quadrant of the radar warning receiver, with the second subset, set B less the fourth quadrant of the radar warning receiver. Likewise, correspondence 14 provides back-up data for a failure of all 4 quadrants of the radar warning receiver by summing the jammer sets A and B.

Now referring to FIG. 7 which shows a graphic display of the aircraft survivability display indicating partial radar warning receiver back-up in the first quadrant.

The partial RWR back-up apparatus and method of the invention determines which quadrant requires back-up threat generation. Quadrants are identified based on RWR system status. The failed quadrant is displayed with a solid arc segment 1002. The converted threat data is cross-sensor correlated to first, remove the common threats and second, provide the jamming status for RWR threats. The remaining threat data (un-correlated) is processed to determine threat display status such as "new", "old", and "aging-out". The method of the invention then provides a prioritization for these back-up threats. The threat data generated by the Partial RWR Back-up function is further processed by the video apparatus 224 to generate display threat data and by the voice apparatus 226 to generate radar warning voice messages. The video apparatus 224 and the voice apparatus 226 provide output to the aircraft crew.

The video apparatus 224 generates threat symbols based on threat type and operational mode for each back-up threat and provides proper space separation between threats. The back-up threats are placed inside a window located on the periphery of the threat circle.

The voice apparatus 226 generates radar warning voice messages based on the provided back-up threat data. The function uses the information included in the back-up data such as threat type, threat status, threat mode, etc. to properly generate brief and concise voice messages.

Now referring to FIG. 8 which shows a display diagram for the radar warning receiver full back-up threat display.

The full RWR back-up function of the invention provides a full RWR back-up. It processes the converted threat data from the Pulsed Radar Jammer and CW Radar Jammer to determine the threat display status. This is a data processing technique similar to what is used in the Partial RWR Back-up function. Threats contained in the back-up list are prioritized before being passed on to the Video function and the Voice function. The display format for the full RWR back-up is shown in FIG. 8.

In the event the Radar Warning Receiver loses some or all of its threat detection capability, this process automatically provides either partial or full functional back-up of the RWR according to Table A. Since there are two levels of RWR failure, partial or total, there are two back-up sub-processes providing two different back-up modes, the Partial RWR Back-up mode and Full RWR Backup mode.

The Partial RWR Back-up mode monitors the RWR status to determine when a failure has occurred in one or more channels of the receiver quadrants. When a failure is detected, the process begins to process PRJ data to augment the RWR threat warning function in the region where RWR coverage has failed.

In one embodiment of the invention a video back-up is provided and voice warnings are not generated to avoid overlaps with RWR generated voice warnings.

The Perform Full RWR Back-up function 240 monitors the RWR for a complete RWR system failure. In the event a system failure occurs, threat data from the radar jammers is processed to provide warning data to the crew. Full voice warning back-up is provided by the ASE/ACS in this mode. Neither of these back-up functions are invoked if the radar jammer subsystems are not installed on the aircraft.

The invention can be realized in alternate embodiments, one identifying only common threats which can be detected and identified by the Radar Warning Receiver. An alternate embodiment provides voice and/or video for the back-up threats. Yet another embodiment employs a prioritization scheme where threat symbols and voice messages of the Radar Warning Receiver are generated.

The perform partial RWR back-up function 246 operates during a partial failure of the RWR. This failure condition is indicated by the system status of the Radar Warning Receiver 204. When this condition occurs, the Perform Partial RWR Back-up process is initiated. This process uses threat detection data from the installed and operating jammer subsystems to generate Warning information in the failed RWR quadrant(s). The radar jammer track files 210 are only processed for common threats in this mode. Those skilled in the art will recognize that un-correlated threats do not exist in the failed quadrant. By definition jammer unique threats continue to be displayed as complementary threats. The RWR prioritization display rules are used to display the back-up data.

The method of the invention continuously monitors the ASE_System_State 202 to determine when to provide the RWR partial back-up. In one embodiment of the invention, the ASE_System_State is set equal to 9 to 15 inclusively. In the event the jammers are not installed or both have failed, this sub-process is invoked. Given that one or both of the jammers are available to support the back-up function, this process monitors the bit settings in the System Status output message from the Radar Warning Receiver to determine if a failure has occurred and the extent of the failure. If a partial failure is indicated, the Partial Back-up mode is invoked; if a total RWR failure is indicated, the Full Back-up mode is invoked. In the case of Partial Back-up, there are six basic data sub-processes that are required to support different partial failure modes of the RWR. The sub-processes are described below.

Subprocess 1: If the right channel of the forward receiver fails (i.e. bit 1, word 2 of the bus message is set equal to one (1)), RF threats located in the first quadrant are not detected by the RWR. This back-up sub-process uses radar emitter track file data for threats received by the CW Radar Jammer and from the right antenna of the Pulsed Radar Jammer. The Pulsed Radar Jammer data must be further processed to extract threats already detected by the RWR in the still functioning second quadrant. The steps invoked in this sub-process are outlined herein:

Step 1: The jammer emitter identifications (ID) contained in the radar jammer track files are converted to compatible radar warning emitter ID's. Only common convertible emitters are used for back-up while the remaining unique emitters are presented as complementary threats.

Step 2: Threats from the RWR track file having an AOA between 270 and 360 degrees are extracted from and compared to the appropriate portions of the radar jammer active threat track file (i.e. the CW detection file and that from the right antenna of the Pulsed Radar Jammer). If a match occurs, that threat emitter is marked as "common" and removed from the radar jammer active threat track file.

Step 3: Emitters remaining in the track file from Step 2 are prioritized for display. These threat symbols are displayed along a 45 degree radial on the RWR display area. Additionally, a ninety degree solid arc segment 1002 is displayed from 0 to 90 degrees on the perimeter of the RWR display to indicate that the Radar Warning Receiver has failed in that region and that radar jammer data with degraded angular resolution is being used to provide RF warning therein.

Sub Process 2: If the left channel of the forward receiver fails (i.e. bit 00, word 2 of the data bus message is set equal to a one (1)), RF threats located in the fourth quadrant are not detected by the RWR. This back-up sub-process uses radar emitter track file data for threats received by the CW Radar Jammer and from the left antenna of the Pulsed Radar Jammer. The Pulsed Radar Jammer data must be further processed to extract threats already detected by the RWR in the still functioning third quadrant. The steps involved in this sub-process are outlined below:

Step 1: The jammer emitter identifications (ID) contained in the radar jammer track files are converted to compatible radar warning emitter ID's. Only common convertible emitters are used for back-up while the remaining unique emitters are presented as complementary threats.

Step 2: Threats from the RWR track file having an AOA between 180 and 270 degrees are extracted from and compared to the appropriate portions of the radar jammer active threat track file (i.e. the CW detection file and that from the right antenna of the Pulsed Radar Jammer). If a match occurs, that threat emitter is marked as "common" and removed from the radar jammer active threat track file.

Step 3: Emitters remaining in the track file from Step 2 are prioritized for display based on predefined prioritization rules. These threat symbols are displayed along a 135 degree radial on the RWR display area. Additionally, a ninety degree solid arc segment is displayed from 90 to 180 degrees on the perimeter of the RWR display to indicate that the Radar Warning Receiver has failed in that region and that radar jammer data with degraded angular resolution is being used to provide RF warning therein.

Subprocess 3: If the left channel of the aft receiver fails (i.e. bit 02, word 02 of the data bus message is set equal to a one (1)), RF threats located in the third quadrant are not detected by the RWR. This back-up sub-process uses radar emitter track file data for threats received by the CW Radar Jammer and from the left antenna of the Pulsed Radar Jammer. The Pulsed Radar Jammer data must be further processed to extract threats already detected by the RWR in the still functioning fourth quadrant. The steps involved in this subprocess are outlined below:

Step 1: The jammer emitter identifications (ID) contained in the radar jammer track files are converted to compatible radar warning emitter ID's. Only common convertible emitters are used for back-up while the remaining unique emitters are presented as complementary threats.

Step 2: Threats from the RWR track file having an AOA between 90 and 180 degrees are extracted from and compared to the appropriate portions of the radar jammer active threat track file (i.e. the CW detection file and that from the right antenna of the Pulsed Radar Jammer). If a match occurs, that threat emitter is marked as "common" and removed from the radar jammer active threat track file.

Step 3: Emitters remaining in the track file from Step 2 are prioritized for display based on predefined prioritization rules. These threat symbols are displayed along a 225 degree radial on the RWR display area. Additionally, a ninety degree solid arc segment is displayed from 180 to 270 degrees on the perimeter of the RWR display to indicate that the Radar Warning Receiver has failed in that region and that radar jammer data with degraded angular resolution is being used to provide RF warning therein.

Subprocess 4: If the right channel of the aft receiver fails (i.e. bit 03, word 02 of the data bus message is set equal to a one (1)) and RF threats located in the second quadrant are not detected by the RWR. This back-up sub-process uses radar emitter track file data for threats received by the CW Radar Jammer and from the right antenna of the Pulsed Radar Jammer. The Pulsed Radar Jammer data must be further processed to extract threats already detected by the RWR in the still functioning first quadrant. The steps involved in this subprocess are outlined herein:

Step 1: The jammer emitter identifications (ID) contained in the radar jammer track files are converted to compatible radar warning emitter ID's. Only common convertible emitters are used for back-up while the remaining unique emitters are presented as complementary threats.

Step 2: Threats from the RWR track file having an AOA between 0 and 90 degrees are extracted from and compared to the appropriate portions of the radar jammer active file (i.e. the CW detection file and that from the right antenna of the Pulsed Radar Jammer). If a match occurs, that threat emitter is marked as "common" and removed from the radar jammer active threat track file.

Step 3: Emitters remaining in the track file from Step 2 are prioritized for display based on predefined prioritization rules. These threat symbols are displayed along a 315 degree radial on the RWR display area. Additionally, a ninety degree solid arc segment is displayed from 270 to 360 degrees on the perimeter of the RWR display to indicate that the Radar Warning Receiver has failed in that region and that radar jammer data with degraded angular resolution is being used to provide RF warning therein.

Subprocess 5: If both left channels of the forward and aft receivers fail (i.e. bit 00 and bit 02, word 02 of the data bus message are set equal to one (1)), RF threats located on the third and fourth quadrants will not be detected by the RWR. This back-up sub-process uses radar emitter track file data for threats received by the CW Radar Jammer and from the left antenna of the Pulsed Radar Jammer. Similarly, Steps 1 and 3 are used in this sub-process, but not Step 2. These threat symbols are displayed along a 180 degree radial on the RWR display area. Additionally, a one hundred-eighty degree solid arc segment is displayed from 90 to 270 degrees on the left side of the perimeter of the RWR display to indicate that the Radar Warning Receiver has failed in that region, and that radar jammer data with a degraded angular resolution is being used to provide an RF warning therein.

Subprocess 6: If both right channels of the forward and aft receivers fail (i.e. bit 01 and bit 03 of data word 02 of the data bus message are set equal to one (1)), RF threat located on the first and second quadrants will not be detected by the RWR. This back-up sub-process uses radar emitter track file data for threats received by the CW Radar Jammer and from the right antenna of the Pulsed Radar Jammer. Similarly, Steps 1 and 3 are used in this sub-process, but not Step 2. These threat symbols are displayed along a 0 degree radial on the RWR display area. Additionally, a one hundred-eighty degree solid arc segment is displayed from 90 to 270 degrees on the right side of the perimeter of the RWR display to indicate that the Radar Warning Receiver has failed in that region, and that radar jammer data with degraded angular resolution is being used to provide an RF warning.

As multiple quadrant failures occur within the RWR, the appropriate combination of the above sub-processes are employed as necessary. If all four quadrants fail, the ASE/ACS invokes the Full Back-up mode.

Back-up threats are displayed as described in the above sub-processes. Their display placement is defined by the RWR prioritization tables. The highest priority threat appears on the top and is then followed by lower priority threats.

In one preferred embodiment of the invention this process is performed at the rate of 2 Hz ($\pm 0.1$ Hz) or faster.

In the event the Radar Warning Receiver is not installed or has completely failed, the aircraft survivability method and apparatus of the invention will invoke the Full Back-up process. This process uses RF receive data from the active radar jammer systems and displays this information as complementary threats due to the lack of the angle of the arrival data. Threats are displayed based upon the RWR prioritization criteria. Voice messages are also generated by the system. This process is not invoked if the jammers are not installed or are not functional.

The Full Back-up process is invoked if the ASE system state indicates that the Radar Warning Receiver is either inoperative or is not installed and either or both the Pulsed Radar Jammer and CW Radar Jammer are functional (i.e. ASE_System_State 202 is set equal to 17, 18, or 21 for the PRJ or is set equal to 17, 18, or 20 for the CWJ). Jammer track files are processed to convert the RWR compatible threats to the RWR threat emitter ID's for the purpose of generating voice warning messages. Un-correlated threats continue to be processed as complementary threats.

The process of generating back-up RWR display symbols and voice warnings requires the execution of the following functions: threat emitter ID conversion, threat prioritization, voice message generation, and threat display.

The pulse radar emitter ID's generated by the Pulsed Radar Jammer are processed for conversion to RWR-compatible emitter ID's. The radar emitter ID generated by the CW Radar Jammer is processed for conversion to a RWR-compatible emitter ID. Corrected threats are passed on for prioritization and voice warning generation. Un-correlated threats are processed as complementary threats.

Convertible RF threat emitters are prioritized based on a predefined prioritization scheme.

The ASE/ACS prioritizes and generates voice warning messages based upon the threat emitter ID list passed from the threat emitter ID conversion sub-process. These messages are generated using predetermined RWR Voice Warning Generation rules.

Threat symbols for the threat emitter ID list passed from the threat emitter ID conversion sub-process are generated based on predetermined RWR display rules.

Without the AOA RWR data, it is necessary to display all threats as complementary. The threat detected by the CW Radar Jammer is displayed in the window at the top of the RWR display area. Threats detected by the Pulse RF Jammer are displayed in the left or right hand complementary threat window depending on which side of the aircraft the threat was detected on.

A predetermined threat placement rule is used to place the back-up threats in the defined windows. The threat with a higher priority is displayed first and followed by the lower priority threats. This process is performed at the rate of 2 Hz (±0.1 Hz) or faster.

Figure 10B:
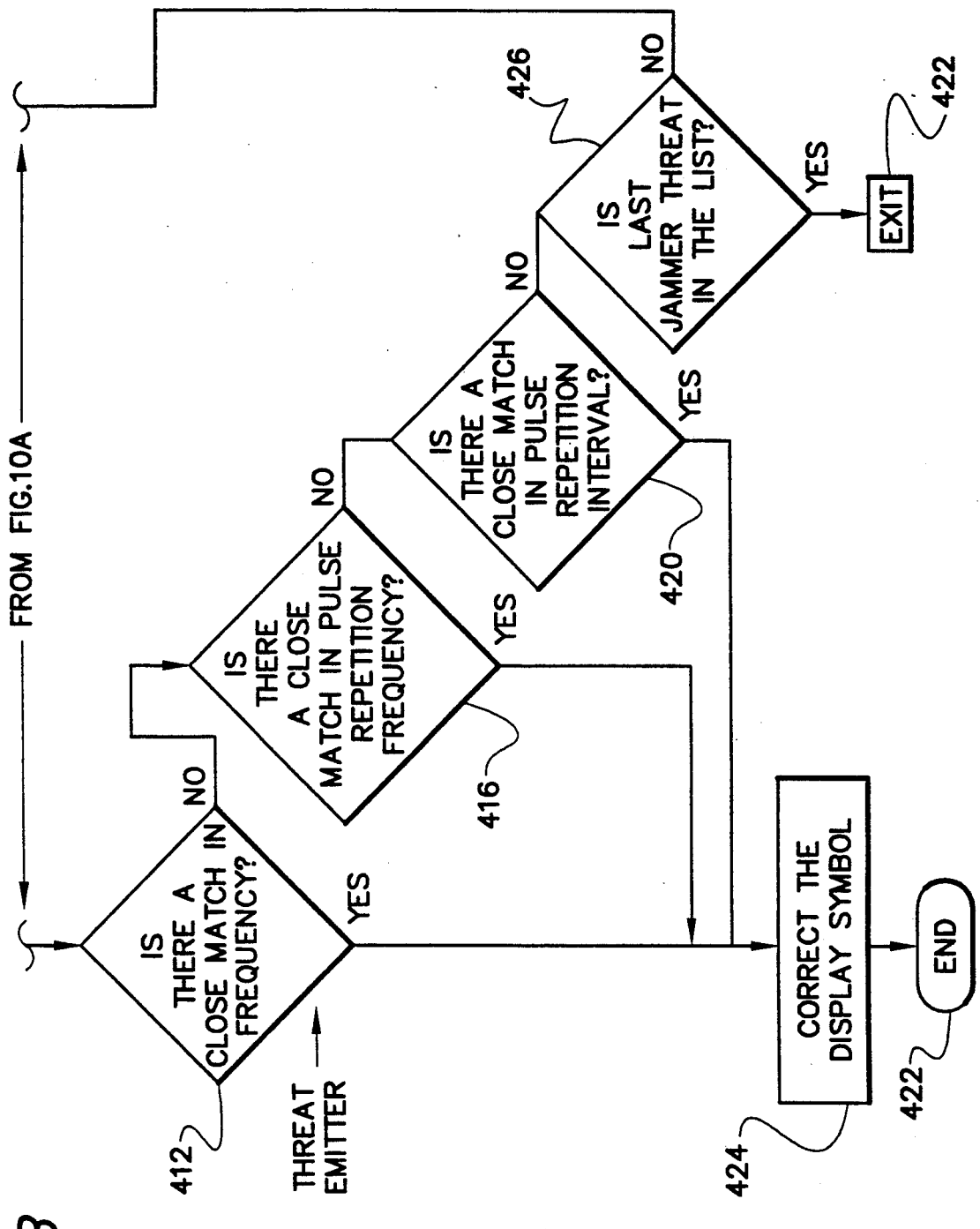
FIGS. 10(a),(b) shows a schematic process flow diagram for the threat ambiguity resolution method of the invention.

Now referring to FIG. 10 which shows a schematic diagram for the threat ambiguity resolver method of the invention. The process starts at step 402. The radar warning receiver threat ambiguity data is read in process step 404. Data for both apparent threats are read. Next, in process step 406 the threat data from the jammer list is read. Each threat is read in from the jammer one threat at a time. The process flows to step 410 which checks whether there is a match in the radar emitter identification. If there is, the process proceeds to check that there is a match in the frequency. If there is no match the process flows to step 414 to determine whether it is the last jammer threat in the list. If it is not the last jammer threat in the list, the process returns to step 406 to read in a new threat from the jammer list. If it is the last jammer threat in the list the process flows to step 422 and ends. If, in step 410, there is a match, the process flows to process block 412 to determine if there is a close match in the frequency from the threat emitter list. If there is not a match the process flows to step 416 to determine whether or not there is a close match in the pulse repetition frequency of the signal. If there is not a close match, the process flows to step 420 to determine whether there is a close match in the pulse repetition interval. If it is not the threat is checked to be the last threat in the jammer list. If it is the last threat in the jammer list the process exits at step 422, but if in step 426 it is not the last threat in the jammer list, the process returns to step 406 to read in the next threat from the jammer list. If in process block 420 there is a close match in pulse repetition interval then the process flows to process step 424 to correct the display symbol for that display cycle thus resolving the ambiguity. If in process step 416 there is a close match in pulse repetition frequency then the process flows again to step 424 to correct the display symbol and resolve the threat ambiguity. If in process step 412 there is a close matching frequency then the process flows to step 424 to correct the display symbol and the threat ambiguity. After step 424 the process flow to step 422 and ends.

Figure 11:
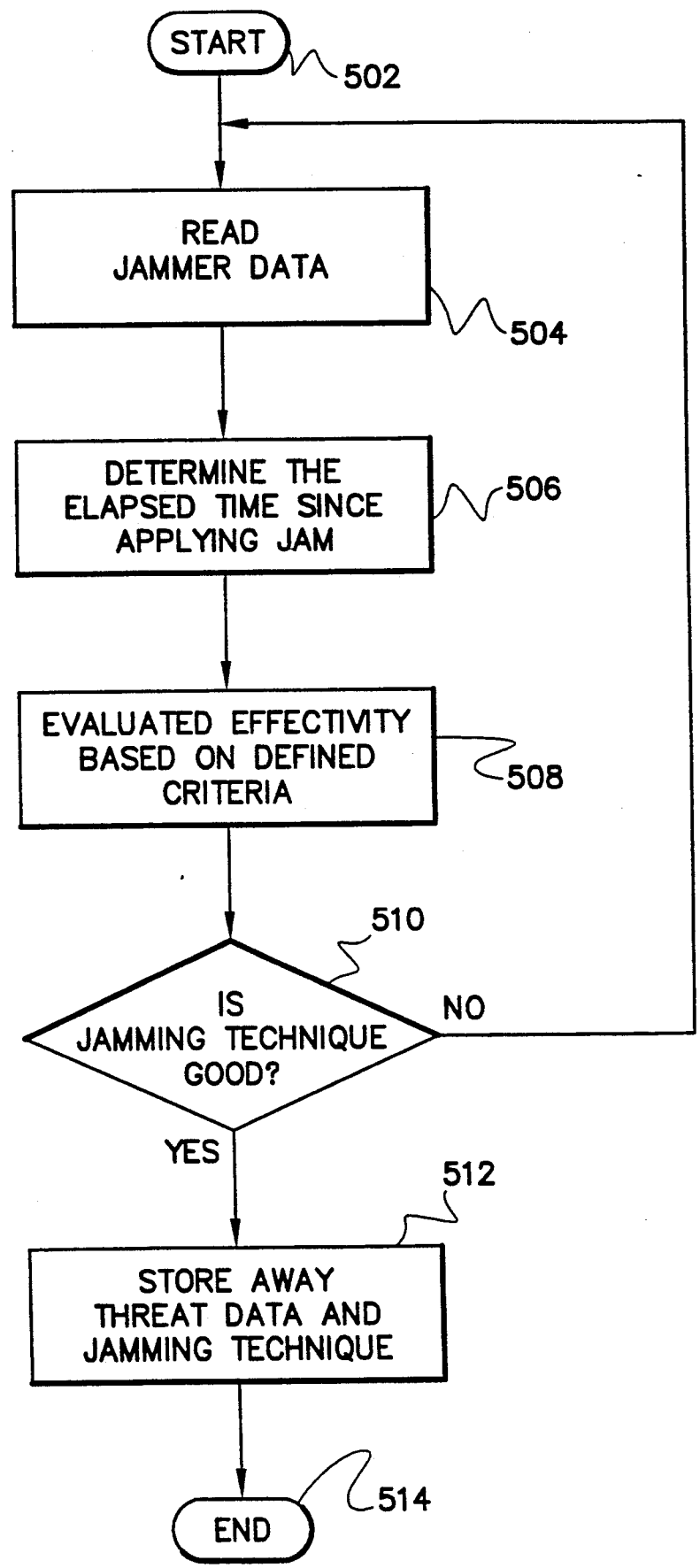
FIG. 11 shows a schematic process flow diagram for electronic countermeasures/countermeasures analyzer method of the invention.

FIG. 11 shows a schematic block diagram for the electronic countermeasures/countermeasures analyzer method of the invention. The process starts at step 502. The process proceeds to monitor the jammer data in step 504. The process then steps to 506 to determine the elapsed time since the jamming has been applied. The process then flows to step 508 to evaluate the jamming effectiveness based on predetermined criteria. The process then flows to step 510 to determine whether the jamming technique is good. If it is not the process returns to process step 504 to repeat the process. If in process step 510 the jamming technique was good then the threat data and the jamming technique is stored into an evaluation data base as shown in step 512. The process then flows to step 514 and ends.

Figure 12:
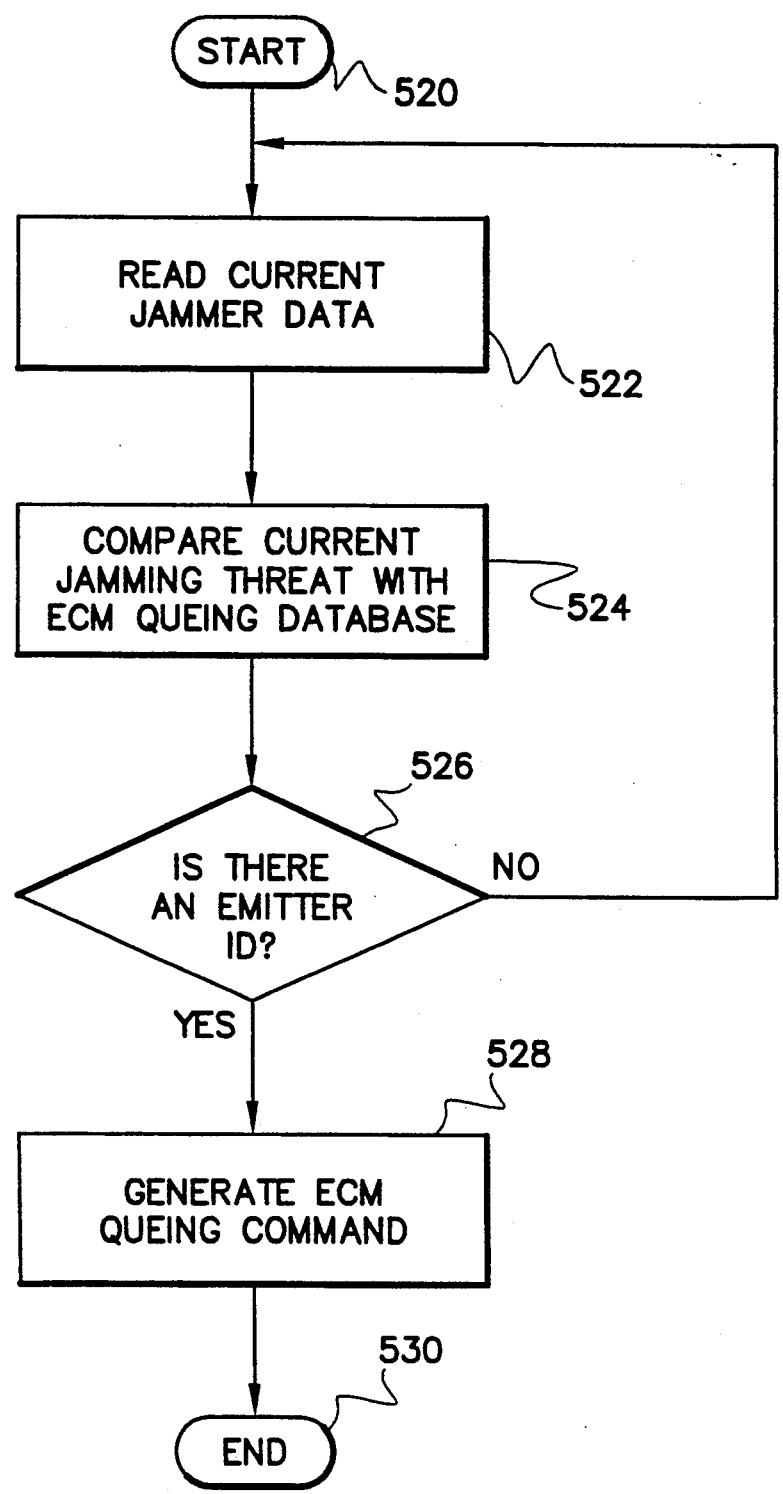
FIG. 12 shows a schematic process flow diagram for jammer optimization method of the invention.

FIG. 12 shows a schematic block diagram for the process of the invention used to search and queue the best jamming technique to the jammers. The process starts at step 520 and proceeds to step 522 which reads in the current threat being jammed from the jammer data. The process then flows to step 524 to compare the current jamming threat with the electronic countermeasures queueing database to determine which is the best countermeasures. The process then flows to step 526 to determine if there is an emitter ID in the emitter database. If it is not the process reads in the next threat being jammed. If in step 526 there is a threat in the emitter ID list then the process flows to step 528 to generate an electronic countermeasures queueing command. The process ends at step 530. In process step 528 the system switches to the best jamming technique known from the evaluation data base.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. Complementary threat sensor data fusion apparatus comprising:

(a) a threat sensor data fusion process control means having a logical control processor, a sensor status input, a sensor data control output, and a fusion process control output;

(b) a threat ambiguity detector means having a control input connected to the sensor data control output and a radar warning receiver data input from a radar warning receiver, having an ambiguity data signal output wherein the sensor data control output switches the radar warning receiver data input;

(c) a radar emitter ID conversion process means having a pulsed radar jammer data input from a pulsed radar jammer, and a continuous wave radar data input from a continuous wave radar, controlled by the sensor data control output, having a converted jammer data output wherein the radar emitter ID conversion process means receives radar emitter IDs from a common radar emitter ID data base;

(d) a missile approach detector input from a missile approach detector, controlled by the sensor data control output having a missile approach detector output;

(e) a complementary threat data means having an input connected to the fusion process control output and a complementary threat data output;

(f) a threat ambiguity resolving means having an ambiguity input connected to the ambiguity data signal output and a threat ambiguity resolution data output;

(g) a functional sensor back-up means having an input connected to the converted jammer data output having a back-up data output; and (h) an electronic countermeasures/countermeasures analyzer means having an input connected to the missile approach detector output and having a tactical electronic countermeasures/countermeasures command output.

2. The complementary threat sensor data fusion apparatus of claim 1 further comprising a multi-pass sensor data correlation means connected to receive data from the pulsed radar jammer, the continuous wave radar jammer, the missile approach detector, and the radar warning receiver.

3. A complementary threat sensor data fusion apparatus of claim 1 further comprising a threat prioritization means to prioritize the complementary threats.

4. The complementary threat sensor data fusion apparatus of claim 1 further comprising a threat video generator connected to receive the complementary threat data, the threat ambiguity resolution data output and the back-up data output having a threat warning video data output.

5. The complementary threat data fusion apparatus of claim 4 wherein the threat data is prioritized by a threat priority means.

6. The complementary threat sensor data fusion apparatus of claim 1 further including a threat voice generator for annunciating the threats.

7. The complementary threat sensor data fusion apparatus of claim 1 wherein the complementary threat data, the threat ambiguity resolution data, and the back-up data are stored in a voice and message data base.

8. A threat ambiguity resolution method comprising the steps of:

(a) reading a radar warning receiver threat ambiguity list of data from a radar warning receiver;

(b) reading a threat data list from a radar jammer list;

(c) determining whether there is a match between the radar warning receiver threat ambiguity list of data and the radar jammer list based on a radar image ID and if there is not a list determining if the radar jammer list has any more threats to be analyzed, if they do not then ending the method;

(d) determining whether there is a close match in frequency between the radar warning receiver and radar jammer and if there is correcting an associated threat display symbol and resolving the threat ambiguity;

(e) checking if there is a close match in pulse repetition frequency and if there is correcting the an associated threat display symbol and resolving the threat ambiguity;

(f) checking if there is a close match in pulse repetition interval and if there is correcting the an associated threat display symbol and resolving the threat ambiguity; and (g) determining if this threat is the last threat in the jammer list and if it is ending, and if it is not repeating from step (a).

9. A method for electronic countermeasures/countermeasures analysis for a radar jammer having at least one jamming strategy, the method comprising the steps of:

(a) reading electronic countermeasures jamming data from a jammer threat list having at least one threat;

(b) determining the elapsed time since applying a last jamming strategy for the at least one threat;

(c) evaluating the effectiveness of the jamming strategy based on a predetermined criteria;

(d) determining if the jamming strategy was effective and if it was not effective repeating step (a); and (e) storing in an evaluation data base the type of threat and the jamming strategy for evaluating the effectiveness of the jamming strategy based on the at least one threat.

10. The method of determining a best jamming technique for a electronic countermeasures/countermeasures aircraft survivability system having a radar jammer having at least one jamming strategy, the method comprising the steps of:

(a) reading the current threat being jammed from a set of jammer data;

(b) comparing the current jammer threat with an electronic countermeasures queueing data base wherein the electronic countermeasures queueing data base contains the at least one jamming strategy;

(c) determining whether or not the threat is in an emitter ID list and if it is not then reading in the next threat and starting at step (a); and (d) generating an electronic countermeasures queueing command to switch to a next best jamming strategy.

11. An integrated aircraft survivability equipment apparatus comprising:

(a) data bus means having a data bus control input;

(b) means for aircraft survivability integration having a multifunction display output, a data bus control output connected to the data bus control input, a radar warning receiver control output, a pulsed radar jammer control output, a continuous wave radar jammer control output, and a missile approach detector control output;

(c) radar warning receiver means connected to the data bus means and having a radar warning receiver control input connected to the radar warning receiver control output;

(d) pulsed radar jammer means connected to the data bus means having a pulsed radar jammer control input connected to the pulsed radar jammer control output;

(e) continuous wave radar jammer means connected to the data bus means having a continuous wave radar jammer control input connected to the continuous wave radar jammer control output;

(f) missile approach detector means connected to the data bus means having a missile approach detector control input connected to the missile approach detector control output;

(g) complementary threat sensor data fusion means connected to the data bus having a complementary threat output; and (h) multifunction display means having a multifunction display input connected to the multifunction display output, the multifunction display means further connected to a keyboard control unit.

12. The integrated aircraft survivability equipment apparatus of claim 11 wherein the complementary threat sensor data fusion means further comprising:

(a) a threat sensor data fusion process control means having a logical control processor, a sensor status input, a sensor data control output, and a fusion process control output;

(b) a threat ambiguity detector means having a control input connected to the sensor data control output and a radar warning receiver data input from the radar warning receiver, having an ambiguity data signal output wherein the sensor data control output switches the radar warning receiver data input;

(c) a radar emitter ID conversion process means having a pulsed radar jammer data input from the pulsed radar jammer, and a continuous wave radar data input from a continuous wave radar, controlled by the sensor data control output, having a converted jammer data output wherein the radar emitter ID conversion process means receives radar emitter IDs from a common radar emitter ID data base;

(d) a missile approach detector input from a missile approach detector, controlled by the sensor data control output having the missile approach detector output;

(e) a complementary threat data means having an input connected to the fusion process control output and a complementary threat data output;

(f) a threat ambiguity resolving means having an ambiguity input connected to the ambiguity data signal output and a threat ambiguity resolution data output;

(g) a functional sensor back-up means having an input connected to the converted jammer data output having a back-up data output; and (h) an electronic countermeasures/countermeasures analyzer means having an input connected to the missile approach detector output and having a tactical electronic countermeasures/countermeasures command output.

13. The integrated aircraft survivability equipment apparatus of claim 12 further comprising a multi-pass sensor data correlation means connected to receive data from the pulsed radar jammer, the continuous wave radar jammer, the missile approach detector, and the radar warning receiver.

14. The integrated aircraft survivability equipment apparatus of claim 12 further comprising a threat prioritization means to prioritize the complementary threats.

15. The integrated aircraft survivability equipment apparatus of claim 12 further comprising a threat video generator connected to receive the complementary threat data, the threat ambiguity resolution data output and the back-up data output having a threat warning video data output.

16. The complementary threat data fusion apparatus of claim 15 wherein the threat data is prioritized by a threat priority means.

17. The integrated aircraft survivability equipment apparatus of claim 12 further including a threat voice generator for annunciating the threats.

18. The integrated aircraft survivability equipment apparatus of claim 12 wherein the complementary threat data, the threat ambiguity resolution data, and the back-up data are stored in a voice and message data base.

19. The integrated aircraft survivability equipment apparatus of claim 11 wherein the means for aircraft survivability integration further includes a decoy dispenser control output and the integrated aircraft survivability equipment state machine apparatus further comprises a decoy dispenser means having a decoy dispenser input connected to the decoy dispenser control output.

20. The integrated aircraft survivability equipment apparatus of claim 11 wherein the means for aircraft survivability integration further includes a communication means for communicating to other aircraft survivability equipment, satellites and ground stations.

* * * * *